United States Patent
Mercer

(10) Patent No.: US 6,756,784 B2
(45) Date of Patent: Jun. 29, 2004

(54) ORIENTATION SENSOR ARRANGEMENT AND METHOD FOR USE IN A SYSTEM FOR MONITORING THE ORIENTATION OF AN UNDERGROUND BORING TOOL

(75) Inventor: John E. Mercer, Kent, WA (US)

(73) Assignee: Merlin Technology, Inc., Renton, WA (US)

(*) Notice: Subject to any disclaimer, the term of this patent is extended or adjusted under 35 U.S.C. 154(b) by 48 days.

(21) Appl. No.: 10/324,804

(22) Filed: Dec. 19, 2002

(65) Prior Publication Data

US 2003/0076106 A1 Apr. 24, 2003

Related U.S. Application Data

(63) Continuation of application No. 09/667,168, filed on Sep. 21, 2000, now Pat. No. 6,525,538, which is a continuation of application No. 09/518,905, filed on Mar. 3, 2000, now Pat. No. 6,232,780, which is a continuation of application No. 09/058,981, filed on Apr. 13, 1998, now Pat. No. 6,057,687, which is a continuation of application No. 08/731,056, filed on Oct. 9, 1996, now Pat. No. 5,767,678, which is a continuation of application No. 08/442,481, filed on May 16, 1995, now Pat. No. 5,633,589, which is a continuation of application No. 08/259,441, filed on Jun. 14, 1994, now Pat. No. 5,444,382, which is a continuation of application No. 07/958,941, filed on Oct. 9, 1992, now Pat. No. 5,337,002, which is a continuation-in-part of application No. 07/662,939, filed on Mar. 1, 1991, now Pat. No. 5,155,442.

(51) Int. Cl.$^7$ ............................ G01L 3/11; G01L 3/165; A04B 13/05

(52) U.S. Cl. .......................................... 324/326; 175/45

(58) Field of Search ................................ 324/326, 338, 324/339, 225; 175/45

(56) References Cited

U.S. PATENT DOCUMENTS

3,096,591 A   7/1963   Higgins et al.
3,597,680 A   8/1971   Hadden (List continued on next page.)

FOREIGN PATENT DOCUMENTS

GB   1056768   1/1967   ................. 324/326

OTHER PUBLICATIONS

D. L. Hore and P. M. Flowerdew, "Developments in Inductive Analogue Transducers for 360° Rotation or Tilt, and for Linear Displacement", Radiodetection Ltd., UK.

Radiodetection Corporation, Monitoring the Progress of Horizontal Boring Tools, Apr. 1990, Radiodetection Corporation Brochure.

FlowMole Corporation, FloMole Guideril™ Underground Utility Service, Jan. 1988, FloMole Corporation Brochure.

Mercer et al, Guided Boring Equipment for Producing Tunnels less than 150mm in Diameter, Jun. 1987, No–Dig 87.

Mercer et al, Achievements of the Guidedril™ Boring System, Jun. 1988, No–Dig 88.

The Charles Machine Works, Inc., Pierce Airrow Pneumatic Piercing Tools, Oct. 1990, Ditch Witch Brochure,.

*Primary Examiner*—Walter E. Snow
(74) *Attorney, Agent, or Firm*—Michael Pritzkau

(57) ABSTRACT

The present invention provides a locator/monitor capable of locating a boring tool and monitoring the progress of the tool for control purposes. The locator/monitor may be used in expedited locating methodology and straightforward calibration techniques of the present invention. A durable and cost effective pitch sensor is also provided by the present invention. In addition, the present invention provides a slotted transmitter housing formed of an electrically conductive material, where the magnetic field generated by the transmitter is capable of penetrating to the surface.

74 Claims, 6 Drawing Sheets

U.S. PATENT DOCUMENTS

| | | |
|---|---|---|
| 3,746,106 A | 7/1973 | McCullough |
| 3,906,504 A | 9/1975 | Guster et al. |
| 3,492,951 A | 11/1976 | Erspamer et al. |
| 4,054,881 A | 10/1977 | Raab |
| 4,314,251 A | 2/1982 | Raab |
| 4,319,191 A | 3/1982 | Meador et al. |
| 4,536,714 A * | 8/1985 | Clark .......................... 324/338 |
| 4,584,577 A | 4/1986 | Temple |
| 4,646,277 A | 2/1987 | Bridges et al. |
| 4,651,101 A * | 3/1987 | Barber et al. ................ 324/339 |
| 4,672,321 A | 6/1987 | Howell |
| 4,674,579 A | 6/1987 | Geller et al. |
| 4,710,708 A | 12/1987 | Rorden et al. |
| 4,714,118 A | 12/1987 | Baker et al. |
| 4,806,869 A | 2/1989 | Chau et al. |
| 4,857,851 A | 8/1989 | Anderson |
| 4,881,083 A | 11/1989 | Chau et al. |
| 4,907,658 A | 3/1990 | Stangl et al. |
| 5,014,008 A | 5/1991 | Flowerdew |
| 5,065,098 A | 11/1991 | Salsman et al. |
| 5,089,779 A | 2/1992 | Rorden |
| 5,093,622 A | 3/1992 | Balkman |
| 5,155,442 A | 10/1992 | Mercer |
| 5,174,033 A | 12/1992 | Rider |
| 5,337,002 A | 8/1994 | Mercer |
| 5,444,382 A | 8/1995 | Mercer |
| 5,633,589 A | 5/1997 | Mercer |
| 5,767,678 A | 6/1998 | Mercer |
| 6,002,258 A | 12/1999 | Mercer |
| 6,057,687 A | 5/2000 | Mercer |
| 6,232,780 B1 | 5/2001 | Mercer |

* cited by examiner

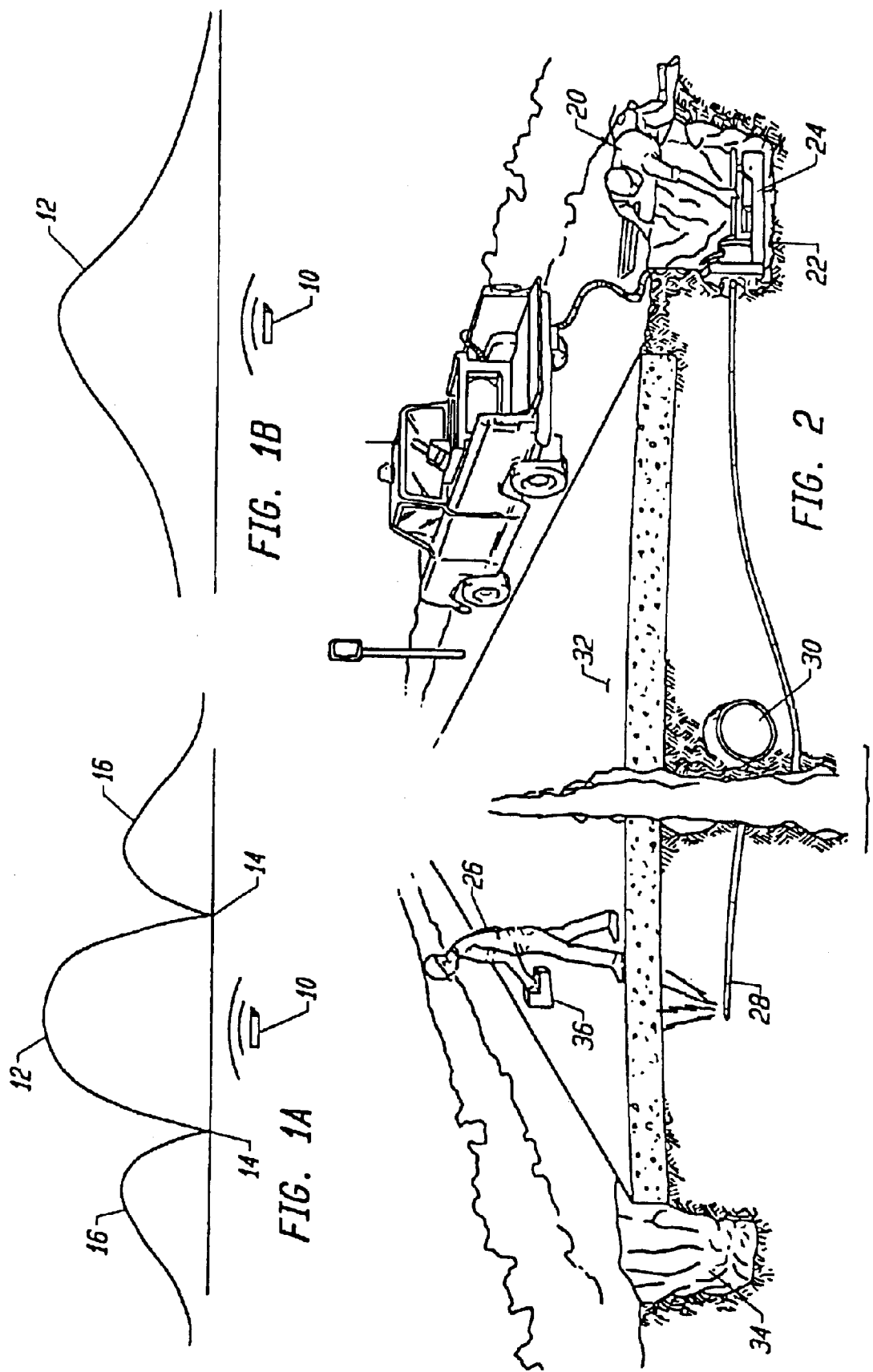

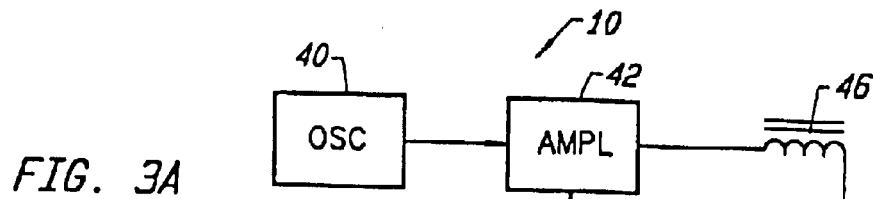
FIG. 3A
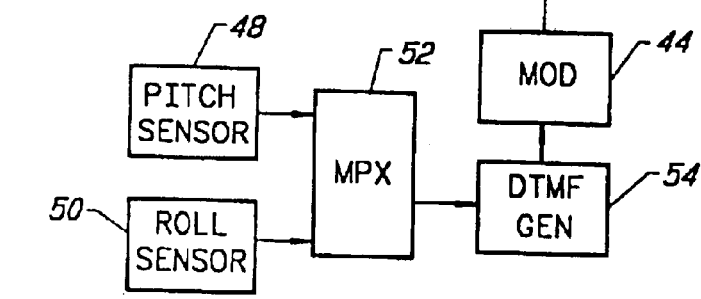
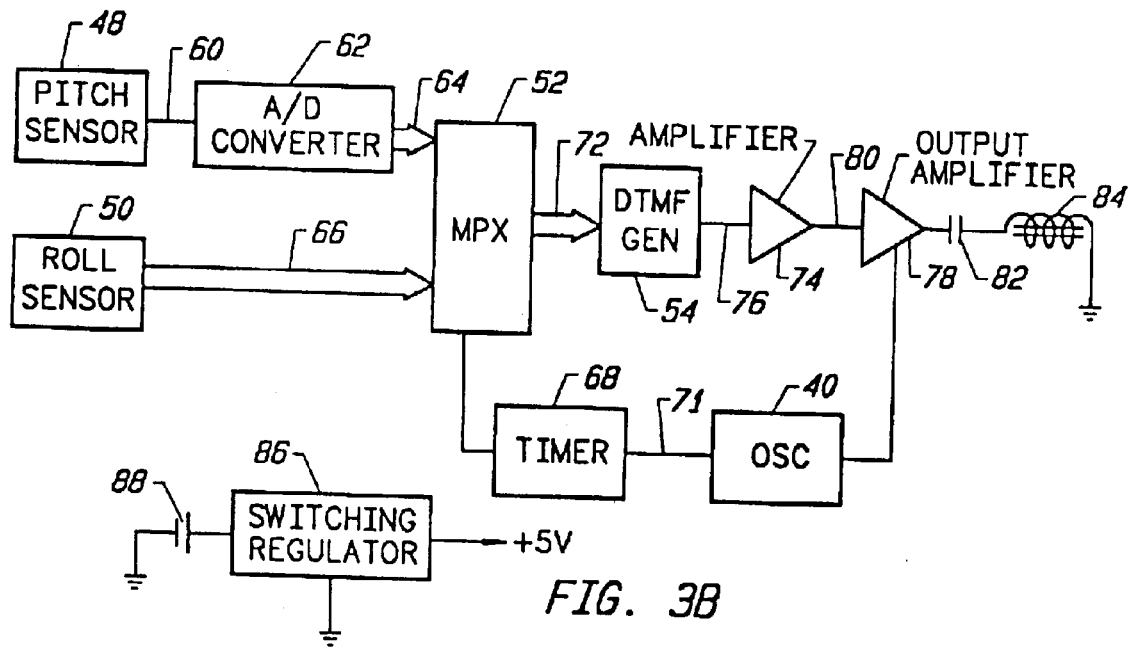
FIG. 3B
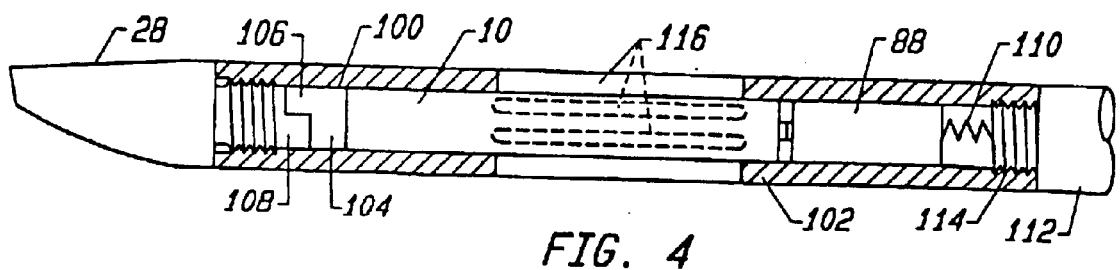
FIG. 4

ORIENTATION SENSOR ARRANGEMENT AND METHOD FOR USE IN A SYSTEM FOR MONITORING THE ORIENTATION OF AN UNDERGROUND BORING TOOL

RELATED APPLICATIONS

This is a Continuation application of copending prior patent application Ser. No. 09/667,168 filed on Sep. 21, 2000 now U.S. Pat. No. 6,525,535, which is a Continuation application of patent application Ser. No. 09/518,905 file on Mar. 3, 2000 now issued as U.S. Pat. No. 6,232,780 on May 15, 2001, which is a continuation of patent application Ser. No. 09/058,981 file on Apr. 13, 1998 now issued as U.S. Pat. No. 6,057,687 on May 2, 2000, which is a continuation of patent application Ser. No. 08/731,056 filed Oct. 9, 1996 now issued as U.S. Pat. No. 5,767,678 on Jun. 16, 1998, which is a continuation of patent application Ser. No. 08/442,481 filed May 16, 1995 now issued as U.S. Pat. No. 5,633,589 on May 27, 1997, which is a continuation of patent application Ser. No. 08/259,441 filed Jun. 14, 1994 now issued as U.S. Pat. No. 5,444,382 on Aug. 22, 1995, which is a continuation of patent application Ser. No. 07/958,941 filed Oct. 9, 1992 now issued as U.S. Pat. No. 5,337,002 on Aug. 9, 1994, which is a CIP of patent application Ser. No. 07/662,939 filed Mar. 1, 1991 now issued as U.S. Pat. No. 5,155,442 on Oct. 13, 1992, from which priority under 35 U.S.C. §120 is claimed, the disclosure of which is incorporated herein by reference.

TECHNICAL FIELD

The present invention relates to apparatus capable of locating and/or monitoring the position (i.e., the depth below a surface and the location within the horizontal plane at that depth) and/or orientation (i.e., yaw, pitch, roll or a combination thereof) of a device located out of view below a surface. More specifically, the present invention is directed to locator/monitor devices that are suitable for use in combination with boring apparatus.

BACKGROUND OF THE INVENTION

Utilities are often supplied from underground lines. Two techniques are generally used to install such lines. In one technique, the utility line pathway is excavated; the line is installed; and the excavated material is replaced. While this method is suitable for new developments, implementation of this technique is not always practical in previously developed areas. As a result, industry development efforts have been focused on excavating tools capable of installing utilities underground without surface disruption.

Several guided and unguided boring tools are currently on the market. Guided tools require substantially continuous location and orientation monitoring to provide the necessary steering information. A prerequisite of such monitoring is, of course, locating the tool that is to be monitored. Only once the position of the tool is located can a proper depth measurement be obtained, for example, from a measuring position directly above the head of the boring tool which houses a transmitter. Unguided tools would also benefit from periodic locating or substantially continuous monitoring, for example, in prevention of significant deviation from planned tool pathways and close tool approaches to utilities or other below surface obstructions.

Locating or monitoring systems currently used in combination with boring apparatus are either cable locating systems or are based on cable locating technology. Although the more advanced systems perform adequately, limitations on cable locating technology also limit measurement accuracy.

Most cable locators involve receiver detection of an oscillating magnetic field derived from electrical current directly fed or induced onto the cable. The magnetic field lines emanating from a cable are essentially cylindrical in shape, forming concentric circles around the cable. As the current flows along the cable, losses occur as a result of displacement and induced currents into the soil. Consequently, the exact signal strength of the magnetic field emanating from the cable at any point is unknown. Although local signal peaks or nulls (depending on receiver antennae and electronic configuration) are useful to determine the surface position directly above the cable, signal strength (i.e., magnetic field strength) alone is not directly indicative of cable depth. In certain specific circumstances (i.e., when the rate of loss along the cable length is not great), a signal strength ratio can be used to compute depth. If the cable run is straight for a long distance (compared to the depth), the magnetic field strength (B) will be inversely proportional to the distance (d) from the cable to the receiver (i.e., B .α. 1/d or B=k/d, where k is a proportionality constant). By taking two signal strength readings at different locations directly above the cable, the proportionality constant can be eliminated and the depth determined.

A simple device for determining the depth of a relatively straight cable is manufactured by Dynatel, a subsidiary of the Minnesota Mining and Manufacturing Company. The Dynatel device includes a single antenna, a gain control knob and a gain doubling switch. The operator determines cable depth by (1) placing the device on the ground above the cable; and (2) adjusting the output displayed on a meter with the gain control knob until the meter needle lines up with a line on the meter scale; (3) doubling the gain with the switch therefor; and (4) vertically elevating the device until the output returns to the original value (i.e., the needle realigns with the meter line referred to in step (2)). Since the magnetic field strength is inversely proportional to the distance, the height of the unit above the ground at step (4) is equal to the depth of the cable. This procedure is accurate, but time consuming. It also becomes impractical for more deeply buried cables, requiring the operator to raise the device above his head.

Other currently used cable locating devices employ two antennae and logic circuitry to determine depth. The antennae are separated by a fixed distance. With this known separation distance and magnetic field strength readings at the antennae, cable depth can be computed. The difficulty with these devices is that there are practical limits regarding antennae separation. If the cable depth is much larger than the antennae separation, which is generally approximately 12 to 18 inches, signal strength measurement accuracy becomes more critical. Measurement accuracy is affected by differential drifting of the electronics associated with the antennae as well as differential responses of the antennae themselves.

Various approaches have been taken to enhance magnetic field strength measurement precision. The accuracy of these approaches increases as the number of components common to the two measurement circuits increases. Current systems accomplish this by taking a magnetic field reading at one antenna; switching the electronics connection from one antenna to the other; and measuring the magnetic field strength at the second antenna. Although this switching methodology eliminates many sources of error, one major error source remains—the antennae. To increase sensitivity, ferrite rods are sometimes employed to enhance the effective capture area of the antennae. As a result of the antennae separation, both antennae may not experience the same thermal environment. The characteristics of ferrite vary measurably with temperature and are not consistent between rods. Alternatively, large diameter air-core coils are employed. Such coils eliminate the inconsistency of the ferrite rods, but still exhibit thermal drift problems. Air-core coils also are generally larger in diameter.

All of these spatially separated two-antenna devices must be periodically calibrated. Any aging or drifting of an a will cause rapid loss in cable depth measurement accuracy, particularly at depths that are large compared to antennae separation. In cable locators, this is generally not a serious problem, since most cables are buried at depths of an 2 or 3 times the separation.

A device conforming to the above-described arrangement is available from Radiodetection Ltd. (Bristol, England), the RD300. The device includes two antennae with horizontal coil axes disposed a fixed vertical distance from each other. In operation, the device is placed on the ground, such that a first receiving antennae sensor is near ground level (e.g., within about 1–2 inches) and a second receiving antennae is located about 16 inches thereabove. The ground therefore serves as a reference surface for depth measurement One disadvantage of this particular prior art device and other devices that operate similarly thereto manifests itself when the reference surface exhibits an obstruction such as a curb, a rock, landscaping or the like, at a desired measurement location. Under these circumstances, an operator must compensate for the obstruction to obtain the depth below the reference surface. Another disadvantage of this equipment is that the depth measurement process is time consuming even after the device is properly located above the transmitter (i.e., a needle must be aligned with a meter line through a knob-actuated adjustment process). Radiodetection Ltd. applies this technology to cable, sewer and pipe location as well as horizontal boring tool monitoring.

The principal means of locating a boring tool head for guidance purposes is to place a radio frequency transmitter in the tool head, and track the tool from the surface using a radio frequency receiver that detects the alternating magnetic field emanating from the transmitter. While this is similar to the cable-locating situation, the type of measurement necessary for accurate guided boring differs, and the requirements therefor are more stringent. Transmitters or sondes generally emit a dipole magnetic field in the normal measurement range, which differs from the source or source-like magnetic field emanating from a utility cable. When a single horizontal antenna is used to measure the strength of a dipole magnetic field, that parameter varies as depicted in FIG. 1a.

A transmitter 10 is located directly below a maximum field strength point 12. Nulls 14 are present in the horizontal field directly ahead and behind maximum 12, causing local peaks 16 in field strength. If a locator/monitor operator were to commence operations at a location substantially ahead or behind the actual transmitter 10 location, he might locate one of local peaks 16 and believe the tool to be directly below. In order to be certain that field strength maximum 12 has been located when using single horizontal antenna devices, another peak must be found and evaluated to be lower in strength (i.e., to be a local peak 16). An operator failing to take this precautionary measure may conclude that transmitter 10 is located at a position that leads or trails its true location. Erroneous depth readings and subsequent misplacement of the bore typically result.

A single vertical antenna fares no better. Vertical antennae will produce a null directly above the transmitter. This null exists along a line extending on both sides of the transmitter, however, and therefore cannot be used to locate a point, such as the transmitter location. Data from a combination of two antennae may be manipulated to provide a more accurate indication of transmitter location. An orthogonal set of antennae can produce the monotonic signal strength variation shown in FIG. 1b.

When guiding a boring tool, the operator constantly requires accurate depth measurements, and time consuming procedures, such as the single antenna cable locator utilizing gain doubling, are therefore not practical. For tool control purposes, the operator must be able to determine the depth gradient to ascertain the direction (i.e., up or down) in which to steer. Gradient determinations require greater precision than depth measurement. Also, boring depth may be a factor of 0 or more greater than practical antennae separation limits of spatially separated two antennae locators.

U.S. Pat. No. 4,806,869 issued to Chau et al. discusses a 5-sensor receiver apparatus capable of "locating the position of a boring device within the ground with respect to a particular reference location along an above ground path directly over the intended course" of the boring device. In this receiver, four sensors are arrayed at the four corners of a square within a horizontal plane (i.e., parallel to the surface), the midpoint of which is displaced vertically from the fifth sensor. Chau et al. indicate that such a receiver is an improvement over a 4-sensor device designed to locate/monitor electronically conductive cable, having sensors located at the end points of two intersecting lines of equal length within a plane that is perpendicular to the surface.

The 4-sensor cable-locating apparatus was not designed for continuous monitoring. Signals from the horizontally placed sensors are used to locate the transmitter, while signals from the two vertically aligned sensors are used to determine cable depth. Such a process is impractical for continuous monitoring.

In contrast, the 5-sensor apparatus utilizes signals from the two horizontally disposed sensors, located in the plane perpendicular to the desired path of the boring device and within which the boring device is actually positioned, and the vertically displaced sensor to determine boring device depth and displacement from its intended path.

The disadvantage of the 5-sensor device is its complexity. This device is also susceptible to locating local peaks 16 in the signal strength. Also, the operator of a 5-sensor device traverses the desired boring device path, rather than locating a position directly above the device.

Again, these 4- and 5-sensor prior art receivers incorporate sensors that are in fixed spatial positions with respect to each other. In contrast, U.S. Pat. No. 4,646,277 issued to Bridges et al. includes a sensing assembly formed of three orthogonal pick up coils. The sensing assembly of the Bridge et al. patent serves as a homing beacon for a boring apparatus, rather than a means to establish the position of the tool head.

U.S. Pat. No. 3,906,504 issued to Guster et al. describes a method of locating and plotting tunnels using a portable receiver to monitor a transmitter moving through the tunnels. Guster et al. employ an antenna having a vertical axis in the transmitter. While this antenna configuration eliminates nulls, such an arrangement is not practical in a boring application, because the head of the boring apparatus rotates. Signal strength emanating from a vertically oriented antenna would therefore vary during boring.

Also, Guster et al. employ very complex mathematics in determining the distance between the transmitter and the receiver. The need for a calibration system involving complicated electronics for use with the Guster et al. system is discussed, without further explanation, at Column 2 of the patent. The Guster et al. estimate regarding the complexity of calibration electronics appears to be accurate in view of the nature of the depth determination employed in the patent.

In addition, Guster et al. employ a pulsed transmitted signal, so as to avoid interference with verbal communication between the receiver operator and the transmitter operator. Pulsed transmitted signals complicate the locating/monitoring process carried out by the receiver.

Steering a boring device also requires information concerning pitch (i.e., angle above or below the X-axis in an XY plane, where the X-axis corresponds to the longitudinal axis of the boring device and the Y-axis is parallel to the gravity vector). Several pitch sensors are known and commercially available. Most of these pitch sensors will not produce a pitch angle independent of the roll orientation (about the X-axis). Those that can produce a roll-insensitive signal are generally expensive to produce and easily damaged by shock loads. Less expensive pitch-sensing devices are generally not sufficiently sensitive or well damped. Because equipment loss is common, most users are reluctant to invest a large amount of money in components that are deployed underground. Consequently, development of low cost pitch sensors capable of surviving the loads and environment associated with boring through soil, rock and debris has been pursued.

U.S. Pat. No. 4,674,579 issued to Geller et al. describes two pitch-sensing devices. One apparatus features a transmitter that includes a mercury switch connected in such a manner that the transmitter is deactivated when the tip of the housing therefor is upwardly inclined. The inclination of the tip may be determined by an operator by measuring the angle of rotation at which the transmitter switches on and off. This type of pitch-sensing device is not highly accurate as a result of inaccuracy in measuring the roll angle of the tool head. This process is also time consuming, thereby reducing the practicality of implementing such a methodology.

The second pitch-sensing device shown in FIG. 8 of and described in the Geller et al. patent includes a first common electrode and two pad-electrode assemblies, including the second and third electrodes, housed within a glass envelope. The glass tube is partially filled with an electrolytic fluid, such that the resistance between the second and third electrodes and the first common electrode varies with the inclination (i.e., pitch) of the device. This pitch-sensing device can be costly to implement.

An additional difficulty with locating and monitoring boring apparatus having a transmitter housed in the boring tool head is that the structural loads and wear experienced by the tool head require that the head be fabricated from a high strength material such as steel or some other metal. Since metals conduct electricity, a transmitter contained within a metal tool head induces a current in the metal. This induced current, in turn, induces a magnetic field that cancels the transmitted field to some extent and, in some circumstances, entirely.

In order to allow the signal emitted by the transmitter to radiate to the surface, one or more windows or openings have been fabricated or machined into the conductive boring tool head. Employing this solution structurally weakens the tool head and may allow debris or ground water to enter the tool head and impinge upon the transmitter, thereby destroying the antennae and/or the related electronics. To avoid such debris and water damage and in an effort to bolster the strength of the windowed tool head, these openings have been filled with composite, ceramic or plastic materials, thereby sealing the transmitter and antennae. These filler materials are not as durable as metal, however, and generally fail long before a metal structure would fail. Typically, filler material failure results in costly electronics destruction. Since the tool structure is weakened by the window, premature tool head failures resulting in the loss of both the tool head and the electronics may also occur, however.

Another difficulty with the use of the window concept is that the radiated field strength becomes a function of tool head orientation. Specifically, in a single window configuration, the field is strongest when emanating from the window and measurably weaker 180.degree. therefrom. Although this result can be useful in determining the tool head roll orientation, it makes it impossible to determine tool depth accurately while drilling, because the tool head is rotating during drilling. To overcome this restriction, multiple small window or slot tool head designs have also been used with mixed success.

In another attempt to overcome this radiated signal problem, the entire tool head structure has been formed with non-conductive materials such as composites and ceramics. Unfortunately, none of these substitute materials exhibits all of the desirable characteristics of steel or other durable conductive metals. Strong ceramics do not handle impact loads as well, while composites do not take abrasive wear as well. These substitute materials are also much more costly than metals.

SUMMARY OF THE INVENTION

The present invention provides a locator/monitor capable of locating a boring tool head for control purposes. The locator/monitor of the present invention is compact, portable, easy to carry and user friendly. Accurate boring tool head depth and orientation measurements may be obtained through flexible procedures that may be modified in accordance with the circumstances under which a measurement is to be made. Precise and continuous depth and periodically updated orientation measurements provide the information necessary to locate and steer the tool head. Depth (i.e., the distance between the reference surface and the transmitter) may also be presented to an operator of the locator/monitor of the present invention as range (i.e., a monotonic function indicative of the distance between the receiver and the transmitter). Straightforward calibration and expedited locating methodology may also be implemented using apparatus of the present invention.

The locator/monitor of the present invention achieves these goals through the operation of an antennae assembly featuring two orthogonal antennae. The antennae are located in spatial proximity to each other (i.e., they are not disposed a fixed distance apart), thereby decreasing the size of the locator/monitor and providing monotonic magnetic field strength information. Once calibrated (i.e., the value of the proportionality constant k relating magnetic field strength and range is known), continuous measurement of range or a gradient thereof, and periodic updated indications of orientation are possible. No manipulation of equipment controls is necessary to initiate or continue generating such data.

Calibration of the locator/monitor of the present invention is achievable through a simple procedure. An operator need only locate the transmitter, deploy the receiver of the locator/ monitor of the present invention at a first convenient height above the transmitter location; measure the magnetic field strength emanating from the transmitter; deploy the receiver at a second convenient height; and measure the magnetic field strength emanating from the transmitter. To permit the value of the proportionality constant to be determined, an independent indicator of the distance between magnetic field strength measurement points is provided by locator/monitors of the present invention. A preferred independent indicator is an ultrasonic receiver-to surface measurement system.

The transmitter may be located in an expeditious manner by "following" dipole magnetic flux lines to the transmitter (i e., determining the minimum distance to the transmitter, indicated by a maximum magnetic field strength reading as the receiver is rotated) in a stepwise fashion. Staged progress is achieved, because dipole magnetic flux lines are not typically straight line paths to the transmitter (they are local tangents to the flux line along the transmitter axis). Sensitivity of this locating procedure can be enhanced by using the square of the magnetic field strength. Ease of accomplishing the locating method is increased by a beeper or visual function designed to indicate passage through a measurement maximum or to predict such passage. The maximum value may be stored in memory to permit later comparisons with new measurements, with beeper or visual indications occurring when a measurement equals or exceeds that held value. The signal squared procedure may also be used to determine yaw orientation of the transmitter.

The present invention also provides a pitch sensor capable of supplying orientation data for devices such as boring tools. The pitch sensor of the present invention may also act as a level reference or an accelerometer. The principal advantages of pitch sensors of the present invention are durability and cost effectiveness.

The pitch sensor of the present invention includes a conductive central rod, running the length of a conductive assembly; two sections of conductive tubing separated by a small gap, where the length of tube sections and gap correspond collectively to the length of the conductive assembly; and electrically conductive fluid disposed within the conductive assembly in an appropriate amount. The amount of conductive fluid is selected, such that the central rod of the pitch sensor is contacted by the conductive fluid when the pitch sensor is in a horizontal position.

The present invention-also provides a transmitter housing formed of a conductive material such as a metal, where the magnetic field generated by the transmitter is capable of penetrating to the surface. In this manner, the structural strength of the housing is preserved; the electronics are protected from debris and water infiltration; and a symmetrical magnetic field is produced by the transmitter.

Radiated signal strength is enhanced by increasing the equivalent induced electrical current path length in the conductive metal transmitter housing of the present invention. This increase is achieved by the presence of slots in the housing structure. Preferably, the diameter of the antennae coil is small in comparison with the housing diameter. In addition, an increased number of slots consistent with maintaining the structural integrity of the housing is also preferred.

DESCRIPTION OF THE DRAWINGS

FIG. 1a indicates magnetic field strength as measured by a single antenna

FIG. 1b indicates magnetic field strength, as measured by two orthogonal antennae.

FIG. 2 shows a partial cross-sectional view of a typical horizontal boring operation.

FIGS. 3a and 3b show block diagrams of a transmitter of the locator/monitor of the present invention.

FIG. 4 shows a cross-sectional view of a boring tool incorporating a transmitter of the locator/monitor of the present invention.

DESCRIPTION OF PREFERRED EMBODIMENTS

Figure 5A:
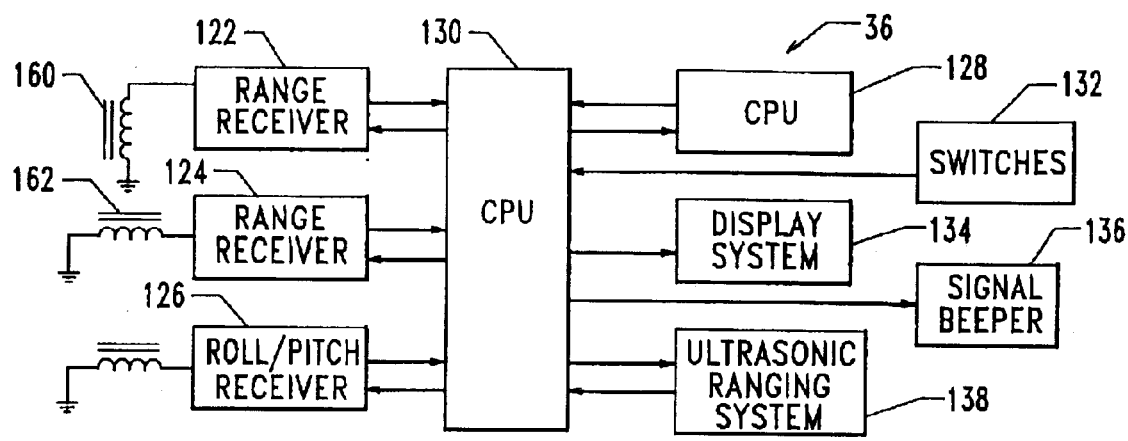
FIGS. 5a and 5b show block diagrams of a receiver of the locator/monitor of the present invention.

While the following preferred aspects of the present invention are described with reference to use thereof in combination with boring apparatus operating in a generally horizontal plane, these aspects are amenable to other uses and applications, as will be recognized by practitioners in the relevant arts. For example, the apparatus of the present invention may be designed to determine the magnetic field strength-depth relationship based on an inverse proportionality (i.e., magnetic field strength .alpha. 1/depth) for cable locating purposes.

Boring apparatus that may be used in combination with the locator/monitor of the present invention are any apparatus capable of or modifiable to be capable of generally horizontal boring and housing a transmitter in a manner allowing a signal emanating from the transmitter to penetrate sufficiently for surface signal detection. Such boring apparatus are known and commercially available. Exemplary boring apparatus useful with the present invention include Ditch Witch P40 and P80, Tru-Trac, and Jet-Trac (Charles Machine Works), Direct Line (Straight Line Manufacturing) or GuideDrill (Utilx, Kent, Wash.).

A typical horizontal boring operation is shown in FIG. 2. The operation generally requires two or more operators. A first operator 20, who may be located in the vicinity of a starting pit 22, is responsible for operation of a boring machine 24. A second locator/monitor operator 26 is responsible for locating a boring tool head 28 and determining steering commands therefor. Tool head 28 is guided around an obstacle 30 at a generally constant depth beneath a reference surface 32 until it reaches a termination pit 34. Locator/monitor operator 26 holds a receiver 36 and uses it to locate the surface position directly above tool head 28. Once locator/monitor operator 26 finds this position, receiver 36 is used to determine the depth of tool head 28. Using a locator/monitor of the present invention, operator 26 can also determine the orientation (yaw, pitch and roll) of tool head 28.

As stated above, the boring apparatus houses the transmitter component of an embodiment of the locator/monitor of the present invention that includes a receiver and a transmitter. Alternatively, the locator/monitor of the present invention may consist of a receiver component designed to cooperate with a transmitter that is already in place or has been obtained separately. In either case, transmitters useful in the present invention are known and commercially available. Exemplary transmitters are 10/SC 0412-8 and 10/SC 0322-8 (Radiodetection Limited, Bristol, England) and Flo-cator (Utilx, Kent, Wash.). A preferred transmitter of the present invention includes a pitch and roll sensor, as described herein. Such preferred transmitters may be used with other receivers or as accelerometers or level references in related or unrelated applications.

Transmitted dipole magnetic fields are preferred for use in the practice of the present invention, because, in part, such fields are fairly constant with time. For the low transmission frequencies used in boring applications, ground attenuation is generally not significant. In contrast to the horizontal cable situation, the magnetic field strength-distance relationship for a dipole magnetic field-generating or -approximating transmitter is inversely cubic along a straight line from the dipole. Specifically, the magnetic field strength (B) at a distance (d) from the transmitter may be represented as follows:

$$B \alpha .1/d^3 \text{ or } B=k/d^3$$

where k is a proportionality constant related to the transmitter signal strength. Because of the inverse cube—relationship between the parameters, the strength of a dipole magnetic field is a very sensitive indicator of transmitter depth changes. As set forth above, a proportionality constant based on an inverse relationship may alternatively be determined for cable locating or other appropriate applications.

FIG. 3a shows a block diagram for a preferred embodiment of transmitter 10 useful in the practice of the present invention. Transmitter 10 incorporates a low frequency oscillator 40 operating from about 4 kHz to about 100 kHz, with about 33 kHz preferred. Oscillator 40 drives an amplifier 42 that is amplitude modulated by a modulator 44. The modulated output of amplifier 42 drives an antenna 46. Modulator 44 provides amplifier 42 with a series of digitally encoded signals derived from a pitch sensor 48 and a roll sensor 50. Specifically, digital output signals from sensors 48 and 50 are multiplexed by a multiplexer 52 which, in turn, drives a Dual-Tone MultiFrequency (DTMF) generator 54. The tone pair produced by DTMF generator 54 modulates the output signal of modulator 44. Specifically, the output of modulator 44 includes the carrier and two side tones. A tone pair is preferred over a single tone as input to modulator 44, because the dual tone requirement lessens the probability that a random signal could be interpreted as data by the receiver. In this system, two legitimate tones are required to constitute data. An analogous system is used in touch-tone telephones to eliminate noise. While this invention will be described with reference to a DTMF generator, it should be understood that other techniques, such as a pulsed signal on a separate carrier frequency can be used to advantage in this context.

A block diagram of an alternative and preferred electronics configuration of transmitter 10 of the present invention is shown in FIG. 3b. Transmitter 10 consists of a pitch sensor 48 to measure the attitude of tool head 28 relative to gravity. Pitch sensor 48 provides an analog signal through line 60 to an A/D converter 62. The digitized output of A/D converter 62 is fed by a data bus 64 to multiplexer 52.

Roll or tool head 28 angle is also measured relative to gravity by means of roll sensor 50, a 12-position mercury switch. The output signal of roll sensor 50 is in digital format, so it can be directly fed to multiplexer 52 by a bus 66. multiplexer 52 is switched between buses 64 and 66 by a timer 68. The output signal of timer 68 is dependent upon oscillator 40 frequency fed to timer 68 by a line 71 (i.e., oscillator 40 frequency is divided to a much lower frequency by timer 68).

Multiplexer 52 provides four, 4-bit nibbles of data through a bus 72 to DTMF generator 54 which produces tone pairs from a selection of frequencies that differ from the carrier frequency. For example, tone pairs may be chosen from 8 frequencies below 1 kHz. As a result, the transmitter of the present invention may employ the same or similar DTMF chips as are used in touch-tone telephone applications, with the chip being clocked at a slower frequency by timer 68 than would be the case in a telephone application. The tone pair is fed to an amplitude modulation amplifier 74 through a line 76. The output signal from modulation amplifier 74 controls the voltage of an output amplifier 78 and is fed to output amplifier 78 through a line 80. Output amplifier 78 is driven, for example, in class D operation (i.e., output amplifier 78 is turned on and off at the carrier frequency, thereby decreasing power dissipation) at, for example, 32768 Hz by oscillator 40. The amplitude modulated signal is fed to a capacitor-inductor pair (82, 84) operating at series resonance of, for example, 32768 Hz. Inductor 84 is preferably an antennae producing a dipole magnetic field. Oscillator 40 frequency may be any frequency that does not interfere with the DTMF generator 54 tone pair and that is not subject to substantial ground attenuation.

Regulated 5 volt power is provided to transmitter 10 by a voltage-controlled switching regulator 86 to which current is supplied by a battery 88. The individual components of transmitter 10 are known and commercially available, with the exception of the preferred pitch sensor described below. As a result, one of ordinary skill in the art could construct and implement transmitter 10, as contemplated by the present invention.

A cross-sectional view of transmitter 10 housed within a typical directional drilling tool head 28 is shown in FIG. 4. Transmitter 10 is sized and configured for sliding engagement within an elongated opening 100 formed in a steel tool body 102. A keyed end section 104 of transmitter 10 consists of a semicircular element 106 which engages a similar keyed head element 108 located on tool head 28. Battery 88 is also slidingly engaged within opening 100 and contacts transmitter 10, thereby making one electrical connection. The other electrical connection is made through a spring 110 attached to a remaining drill string 112 through a set of threads 114. One or more elongated slots 116 in steel tool body 102 provide for penetration of steel tool body 102 by the magnetic field generated by transmitter 10.

While the interface between transmitter 10 and tool body 102 is described and depicted as a keyway/key arrangement, any other interfacing mechanism capable of stabilizing transmitter 10 within tool body 102 at an appropriate orientation may be used. The appropriate orientation of transmitter 10 is any one in which data from pitch sensor 48 and roll sensor 50 may be properly related to the pitch and roll of tool head 28. Similarly, a specific set of electrical connections and structure for making them are described and depicted. Any similar mechanism may be employed to achieve this end. One of ordinary skill in the art could therefore interface transmitter 10 with boring apparatus 24 and provide power thereto to produce a dipole magnetic field.

Receiver 36 of a preferred embodiment of the present invention involves a single antenna location employing two orthogonally disposed antennae. If two orthogonal antennae are used to measure the horizontal and vertical components of a dipole magnetic field, and those components are vectorially added, the magnetic field strength varies as shown in FIG. 1b. The orthogonal pair of receiving antennae provide the total magnetic field strength in the plane of the orthogonal antennae axes. As a result, the indicated distance to transmitter 10 will be a monotonic function of the true distance to transmitter 10 along dipole flux lines. Once the location directly above transmitter 10 is determined, a depth reading taken at that position will indicate the true depth, because the field strength perpendicular to transmitter 10 is approximately zero at that point.

The surface location directly above transmitter 10 can be found by searching for the minimum distance reading on the receiver 36 display. Since the monotonic function exhibits only one peak, maximum point 12, locator/monitor operator 26 cannot be misled with respect to transmitter 10 location. Two orthogonal antennae in close spatial relationship are useful in the practice of the present invention, because locator/monitor operator 26 almost always knows the general direction of the bore. If this direction were also unknown, a third antenna, orthogonal to the plane defined by the other two, could be incorporated in receiver 36. In the three-antennae embodiment of receiver 36 of the present invention, the three dimensional components of the magnetic field strength are vectorially added to eliminate all ambiguity regarding transmitter 10 position (i.e., true depth or range is indicated at all times, because the total field is being measured).

Preferably, the two antennae functioning as depth receivers in the present invention are oriented such that one is disposed at a 45.degree. angle to a horizontal plane passing through receiver 36 parallel to the base thereof, and the other is oriented orthogonally thereto. When the antennae are oriented in this configuration and are balanced, and receiver 36 is located directly over transmitter 10, the induced signal (i.e., the amplified receiving antenna output signal) will be the same for both antennae. Antennae are not always balanced, however. If the antennae are not balanced, inaccurate transmitter 10 location will result.

As a result, the present invention may include an automatic antennae balancing means that may be initiated in or as a prerequisite to receiver 36 modes, such as antennae balancing, transmitter locating or calibration, for example. Specifically, an automatic adjustment may be made to amplified antenna output signal gain of a first antenna to balance it with a second antenna amplified output. If the output signal from a first antenna ($OS_1$) is not equal to the output signal from a second antenna ($OS_2$) at a location where it should be equal, OS, will be adjusted by a factor of $OS_2/OS_1$ for each subsequent measurement. Consequently, the amplified output signals from the two antennae (i.e., the antenna/amplifier systems) will be balanced.

Antennae balancing may be accomplished at any point relative to transmitter 10 that equal signal strength is expected at each antennae. Receiver 36 antennae balancing may be conducted, for example, at a point directly over transmitter 10, directly behind or in front of transmitter 10 along the longitudinal axis thereof, or the like.

If a spatially-separated, prior art two antennae device is used with a dipole field, the sensitivity of that device (i.e., the percentage change in output signal divided by the percentage change in distance) depends on the ratio of antennae separation to depth. Measurement sensitivity therefore decreases with increasing depth. On the other hand, if signal strength alone is used in computation as contemplated by the present invention, the locator/monitor measurement sensitivity becomes depth-independent. As a result, a locator/monitor operating on signal strength in an antennae separation-insensitive manner, such as that of the present invention, could be as much as an order of magnitude more sensitive at a depth of 10 feet. To achieve depth-independent measurement sensitivity, the proportionality constant relating distance to the cube root of magnetic field strength must be conveniently determinable, however.

The aforementioned factors and parameter relationships indicate, and the prior art has recognized, that the distance between transmitter 10 and receiver 36 can be obtained using magnetic field strength measurements alone once the proportionality constant has been determined.

The proportionality constant depends upon a variety of parameters, such as soil characteristics, tool body attenuation and battery strength. As a result, locator/monitors of the present invention should be calibrated (i.e., the proportionality constant should be determined) before use under new conditions or after a substantial period of continual use. Since calibration is required often, a simple procedure therefor, as provided by the present invention, is desirable.

A method to accurately determine the proportionality constant in an antennae separation-insensitive manner is to measure the magnetic field strength at two positions using a "single antenna location" device (e.g., two orthogonal antennae disposed in close spatial proximity), such as the locator/monitor of the present invention. In such a device, the single antenna location is moved between two measurement positions by an operator. Consequently, the spacing between the two measurement positions can be much larger than that of a spatially separated two-antennae device, since packaging requirements do not limit the distance between measurement positions in locator/monitors of the present invention.

In the practice of the present invention, the magnetic field strength ($B_1$) is measured by the orthogonally disposed antennae at a first position that is located a distance $d_1$ from transmitter 10. Similarly, magnetic field strength ($B_2$) is measured at a second position that is vertically displaced from the first position and located a distance $d_2$ from transmitter 10. If the distance d between the first and second positions is known, the variables k, $d_1$ and $d_2$ may be calculated by solving the following equations:

$$B_1 = k/d_1^3$$

$$B_2 = k/d_2^3$$

$$d = (d_2 - d_1)$$

An important feature of this process is that d is accurately ascertainable. As a result, an accurate independent measurement system is incorporated into receiver 36 of locator/monitors of the present invention, so that the distance between the two measurement positions can be determined. The independent distance measuring means could also be separate from the receiver, but such a configuration is not preferred.

One method of achieving such accurate measurement is the use of an ultrasonic measuring device to precisely reference the elevation of receiver 36 above surface 32. An ultrasonic system measures distance by monitoring the time it takes a signal to travel from an ultrasonic transmitter to the surface and back to an ultrasonic receiver. A temperature sensor is preferably included in the ultrasonic measuring device to measure the ambient temperature and correct for the speed of sound variation with temperature. Knowing the distance between the measurement locations d and the two magnetic field strengths $B_1$ and $B_2$, the proportionality constant k and transmitter 10 depth can be determined.

FIG. 5*a* shows a block diagram of a preferred embodiment of a receiver 36 useful in the present invention. Receiver 36 includes three separate receiving units: a first range receiver 122, a second range receiver 124 and a roll/pitch receiver 126. First and second range receivers 122 and 124 preferably involve antennae arranged orthogonally with respect to each other, measuring the vertical and horizontal components, respectively, of the magnetic field emanating from transmitter 10. Range receivers 122 and 124 have very narrow band-pass filters preferably centered on the carrier frequency that strip the modulation side-bands from received signal to provide a steady amplitude carrier signal used for range computation by a CPU 128. Roll/pitch receiver 126 demodulates the received signal and decodes it into 4-bit nibbles that provide roll and pitch orientation information.

The roll-pitch data and the range signals are fed into a CPU interface 130 that converts the analog signals into digital format for processing by CPU 128. CPU interface 130 also sets the gain in range receivers 122 and 124 to maintain the signals in the dynamic range of an A/D converter within CPU interface 130. CPU interface 130 also accepts signals from switches 132 that control receiver 36 functions. Other functions of CPU interface 130 are to drive a display system 134, a signal beeper 136 and an ultrasonic ranging system 138, such as an ultrasonic transducer.

Antennae range receivers 122 and 124 used in receiver 36 of the present invention differ from the spatially separated antennae used in prior art devices. Antennae range receivers 122 and 124 measure different components of the magnetic field emanating from transmitter 10 and are located in spatial proximity to each other.

Figure 5B:
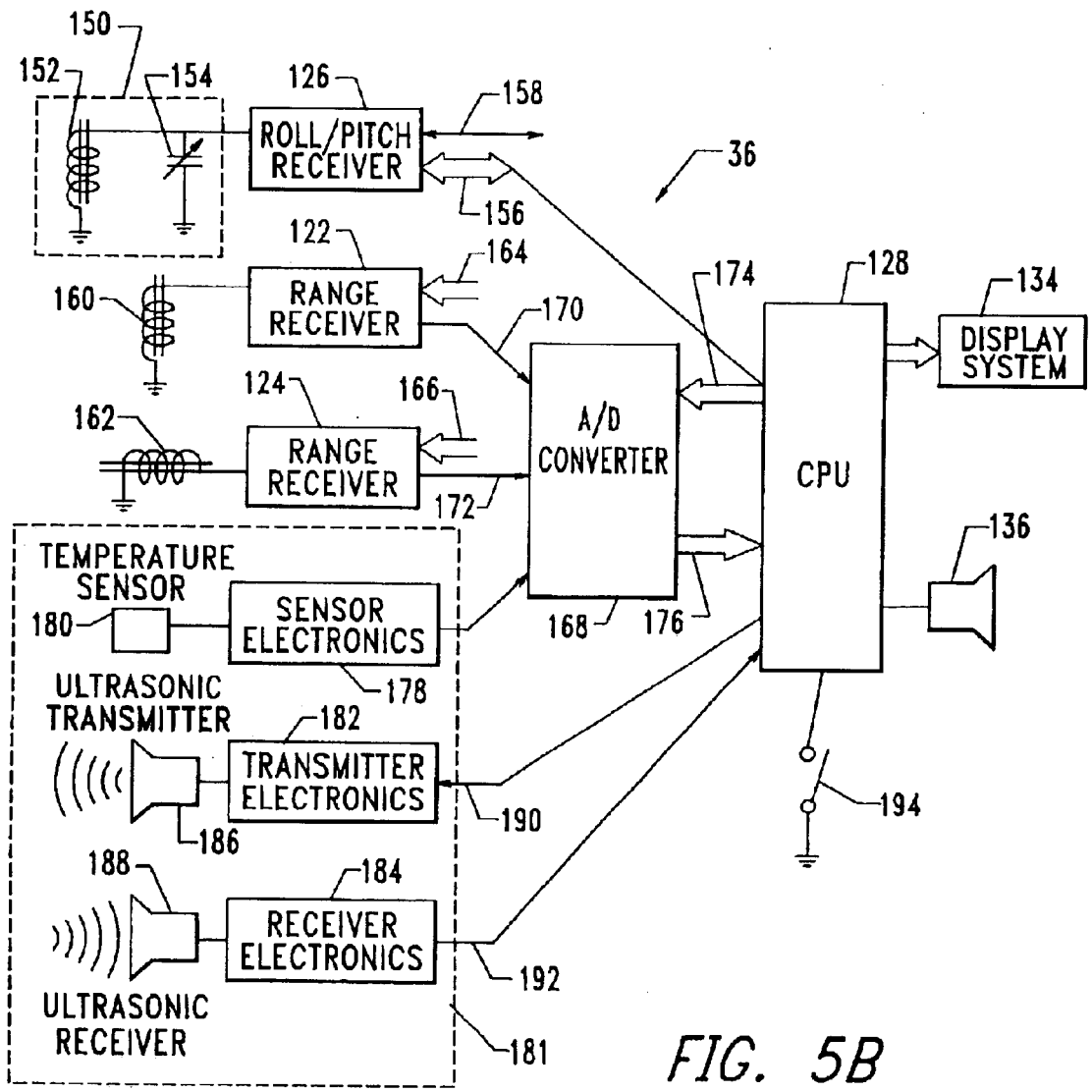

The block diagram of an alternative and preferred embodiment of receiver 36 is shown in FIG. 5*b*. In this embodiment of the present invention, roll-pitch receiver 126 includes a tuned antennae system 150 composed of a coil 152 and a variable capacitor 154. Receiver 126 communicates with CPU 128 through data bus 156 and data strobes 158. Each range receiver 122, 124 has an associated linear antenna 160 and 162, respectively, which are orthogonally disposed. The axes of antennae 160 and 162 may, for example, be offset 45. degree. from a horizontal plane passing through receiver 36 parallel to the base thereof. Gain control buses 164 and 166 permit CPU 128 to set the gain values range receivers 122 and 124. Range receivers 122 and 124 produce an output voltage related to the range from receiver 36 to transmitter 10 and the controlled gain setting of CPU 128. These voltages are fed to a multiplexer and analog-to-digital (A/D) converter 168 through a set of wires 170 and 172. Multiplexer-A/D converter 168 is controlled by a control bus 174 from CPU 128. Channel selection is performed by CPU 128 through control bus 174, and the digitized data are returned to CPU 128 by means of a data bus 176.

A temperature sensor 180 and associated electronics 178 form a part of ultrasonic ranging system 181, including an ultrasonic transmitter 186, an ultrasonic receiver 188 and associated electronics 182 and 184, respectively. Ultrasonic transmitter 186 generates an ultrasonic pulse of sufficient strength and duration to facilitate accurate ultrasonic receiver 188-to-surface 32 measurements. Such pulses may, for example, range from about 30 kHz to about 60 kHz and extend from about 0.25 ms to about 5 ms. A transmitted ultrasonic pulse of approximately 40 kHz and 1 ms duration, for example, is initiated by CPU 128 through a strobe line 190. CPU 128 measures the time between pulse transmission and pulse return, communicated to CPU 128 through a line 192. CPU 128 then calculates the receiver 36-surface 32 range based on the time and ambient temperature.

A control switch 194 provides operator input signals to CPU 128 to control power switching and the various operational modes (e.g., calibration, location, depth measurement, peak signal holding, and range compensation).

Beeper 136 provides operational mode information as well as confirmation and error signaling. Beeper 136 may also be activated during transmitter 10 locating processes as described herein. Data are presented on display 134. Display 134 is preferably configured to supply information on location and orientation of transmitter 10 as well as receiver 36 battery status. Other useful data may also be displayed, if desired.

Receiver 36 is capable of constantly comparing rates of change (i.e., gradients) of the vectorially added magnetic field strength components to provide locator/monitor operator 26 with an indication of his direction of motion relative to transmitter 10 (i.e. toward or away from transmitter 10). Once positioned substantially directly above transmitter 10, operator 26 can rotate receiver 36 to the left or right to determine the yaw orientation of boring apparatus 24 using the displayed field strength rate of change. This operator 26 position is also appropriate for obtaining accurate depth measurements.

The individual components of receiver 36 are known and commercially available. For example, ultrasonic measurement devices useful in receiver 36 are ME 251-1603 (Mouser) and P9934-ND and P9935-ND (Panasonic). As a result, one of ordinary skill in the art could construct and implement receiver 36 as contemplated by the present invention.

Optical means, such as used for camera focusing, or mechanical means may alternatively be employed to determine the distance between magnetic field strength measurement positions. One of ordinary skill in the art would be able to design and implement these distance measuring means.

Since receiver 36 of the locator/monitor of the present invention has only one antennae location, it can be very compact. The prior art two antennae location systems, for example, must accommodate the antennae and the fixed separation therebetween.

The locator/monitor of the present invention is self-calibrating, in that the proportionality constant between magnetic field strength and the inverse cube of the distance between transmitter 10 and receiver 36 can be recomputed at any time. Recalibration might be undertaken when concern about transmitter 10 output or ground attenuation deviation, receiver antennae 122 or 124 alterations resulting from thermal effects, for example, or when any other concern regarding measurement accuracy arises. The calibration procedure uses the transmitter signal from the boring tool, so that the calibration can be conducted during boring. That is, the calibration process of the present invention is not so distinct from normal operation as to require a cessation of normal operation therefor. Since the locator/monitor of the present invention involves only one antenna location, there is only one antenna location/electronics path. As a result, only the linearity of the response in receiver 36 electronics affects measurement accuracy. Fortunately, with modern electronic circuits, linearity is generally not a problem.

Calibration of receiver 36 is performed by holding it close to surface 32 and switching it into calibration mode as described herein. Receiver 36 measures field strength and the ultrasonic range to surface 32. Receiver 36 is raised a vertical distance above the first measurement location, and a second set of measurements is recorded. CPU 128 combines the data from the measurement sets; calculates the range proportionality constant; and stores the information. Notification of correct calibration procedures are accomplished by display 134 and beeper 136.

Digital processing allows for verification of signals by comparing readings and other tests as described herein. Also, CPU 128 circuitry can compensate for the height that operator 26 holds receiver 36 above surface 32. This feature is important when surface 32 obstructions, such as rocks or landscaping, are located at a measurement position. Such an obstruction falsely alters the level of surface 32, thereby falsely increasing or decreasing (if the obstruction is a ditch or hole of some sort) the depth of transmitter 10. In this situation, operator 26 will employ ultrasonic ranging system 138 of the locator/monitor of the present invention at a location adjacent to but free from the obstruction and at a height greater than that of the obstruction. This distance measurement is stored in CPU 128 memory. Operator 26 deploys receiver 36 over the obstruction at substantially the same height that it was deployed at the closely adjacent location. CPU 128 uses the stored distance-to-surface value and displays the depth of transmitter 10 below reference or extended surface 32, despite the obstruction.

A preferred pitch sensor useful in the practice of the present invention is durable and cost effective. Components used to produce a prototype device were obtained from plumbing supply, hardware, or hobby stores and constituted standard fittings and tubing. When used as a pitch sensor for horizontal boring applications, the sensor of the present invention is insensitive to roll orientation.

Figure 6:
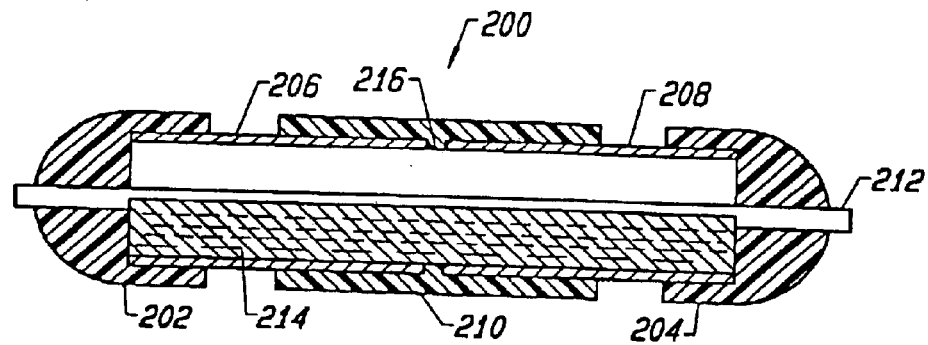
FIG. 6 shows a cross-sectional view of a pitch sensor of the present invention.

As shown in FIG. 6, a pitch sensor 200 consists of two insulating end caps 202 and 204, two outer conductive lengths of tubing 206 and 208, an insulating center coupling 210, a conductive central rod or tube 212 and a conductive fluid 214. Conductive fluid 214 provides a current path between central rod 212 and outer tubes 206 and 208. Tube and 208 are prevented from electrically contacting each other by a gap or ring 216 in center coupling 210. As pitch sensor 200 orients to mimic the orientation of tool head 28, conductive fluid 214 flows to one end of sensor 200 or the other. A larger conductive path will exist between central rod 212 and whichever outer tube 206 or 208 holds the greater volume of fluid 214. By comparing the conductivities between central rod 212 and outer tubes 206 and 208, the pitch angle of pitch sensor 200 can be determined.

A prototype pitch sensor 200 was constructed from ½-inch cpvc plastic water pipe fittings available from plumbing supply and hardware stores. End caps 202 and 204 were drilled in a lathe to accept central rod 212, a 3/16-inch brass tube purchased from a hobby shop. Outer tubes 206 and 208 were short lengths of standard copper water tubing. Conductive fluid 214 was glycerin, with a small quantity of saline solution added to provide for conductivity. Glycerin exhibits a low freezing point and the viscosity necessary for sufficient damping. Prototype pitch sensor 200 was cemented together to prevent leakage of fluid 214. The use of readily available household parts and simple machining allowed prototype pitch sensor 200 to be manufactured at low cost. One of ordinary skill in the art would be able to construct pitch sensor 200 of the present invention.

Figure 7:
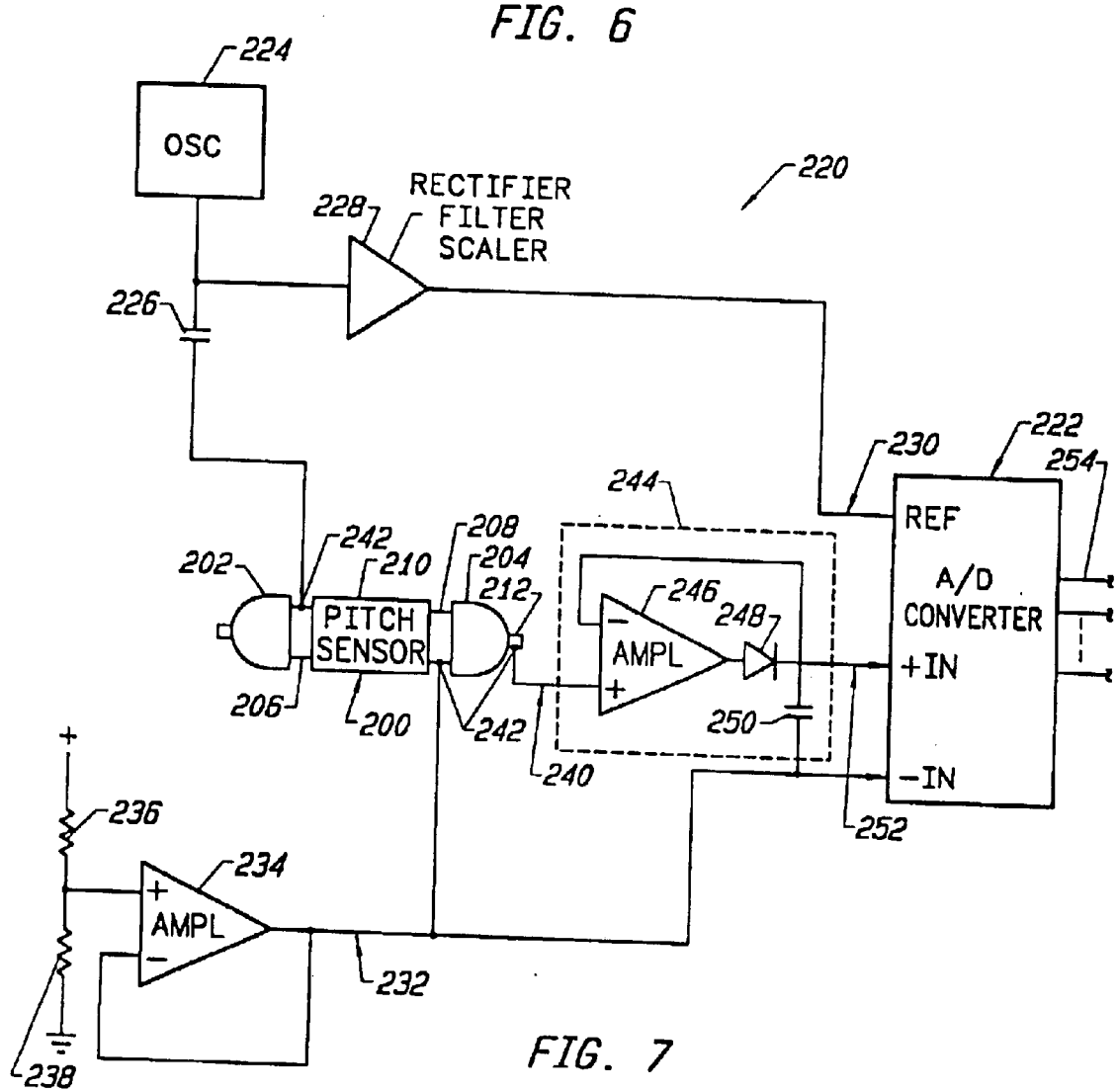
FIG. 7 shows an electronic circuit that is capable of driving a pitch sensor of the present invention.

FIG. 7 shows an electronic circuit 220 capable of driving pitch sensor 200 and providing a digital output. An analog output can also be derived from circuit 220 by eliminating an A/D converter 222. Circuit 220 consists of an oscillator 224 producing an alternating voltage output. Oscillator 224 may produce any convenient alternating voltage output. Outputs ranging from about 50 Hz to about 10 kHz are appropriate for use in the practice of the present invention. For the prototype, the output was a 2 kHz square wave. The output is a.c. coupled to sensor 200 through a capacitor 226. Sensor 200 is preferably driven without any d.c. component to prevent dissociation of conductive fluid 214. Oscillator 224 output is rectified, filtered and scaled by device 228. Output from device 228 is used as a reference voltage 230 for AID converter 222 to compensate for any changes in oscillator 224 output level.

One outer tube 206 or 208 is coupled to capacitor 226. The other outer tube 208 or 206, respectively, is connected to an analog ground 232, provided by an operational amplifier 234. Analog ground 232 voltage level is sufficiently high that the a.c. peaks remain within the operational range of circuit 220. This voltage level is determined by a resistor pair 236 and 238.

Pitch sensor output 240 is taken from central rod 212 at an electrical connection 242. Output signal 240 amplitude is related to the pitch angle of tool head 28. The exact relationship therebetween is determined by pitch sensor 200 geometry as discussed herein. Output signal 240 is fed into a peak detector 244, including an operational amplifier 246, a diode rectifier 248 and a capacitor 250. A peak detected signal 252, analog ground 232 and reference signal 230 are fed into A/D converter 222 that converts the signals to a digital output 254. Since output signal 254 is referenced to oscillator 224 output voltage, any changes in output signal 254 due to fluctuations in oscillator 224 output voltage will be cancelled.

All of the components of electronic circuits 220 capable of driving pitch sensor 200 are known and commercially available. As a consequence, a practitioner in the art could implement pitch sensor 200 of the present invention.

Figure 8:
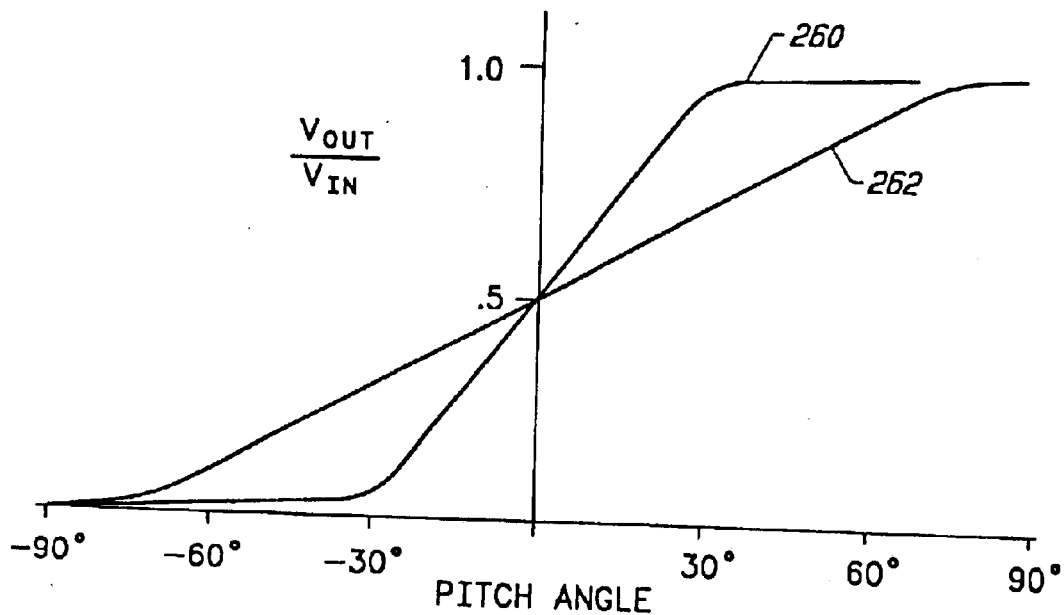
FIG. 8 shows typical pitch response curves that a pitch sensor of the present invention may be designed to emulate.

FIG. 8 shows characteristic output signal 254 curves. For applications where high accuracy over a limited range of pitch is desired, a curve 260 would be preferred. For applications where a broad range of pitch is desired, a curve 262 would be preferred. The variation between curves 260 and 262 is controlled by pitch sensor 200 geometry. Pitch sensor 200 of the present invention may be sized and configured to produce an output signal 254 over the full range of +90 to −90 degrees, if required (e.g., curve 262). Pitch sensor 200 may also be designed to produce its full output signal 254 over an extremely small range (e.g., curve 260).

The alterable geometric parameters are the length-to-diameter ratio of outer tubes 206 and 208, the diameter ratio of central rod 212-to-outer tubes 206 and 208 and the relative level of conductive fluid 214 in pitch sensor 200. A very narrow, highly sensitive pitch resolution may be achieved by broadening the separation between outer tubes 206 and 208 and constructing pitch sensor 200 with a high outer tube 206 and 208 length-to-diameter ratio.

Other pitch sensor 200 characteristics could be achieved through structural alternatives thereof. For example, increasing the amount of fluid 214 in sensor 200 may be undertaken to limit the voltage range.

A well-damped output signal 254 can be obtained using a viscous fluid 214 in sensor 200. Glycerin or a polymer exhibiting the desired elevated viscosity may be used for this purpose. If a nonconductive liquid is used to provide the viscosity, a conductive liquid or a salt must be added to form conductive fluid 214. The required degree of fluid 214 conductivity required depends on the associated electronic circuitry 220. Since output signal 254 is based on a ratio of conductive paths, pitch sensor 200 performance is insensitive to fluid 214 conductivity. As the conductivity increases, the drive current from oscillator 224 for circuit 220 shown in FIG. 7 will increase, however. If low power is desired, then fluid 214 should exhibit low conductivity.

Sensor 200 can be used as an accelerometer, since an acceleration along the axis of central rod 212 will cause fluid 214 displacement in the same manner as a pitch rotation. In an accelerometer application, signal damping assumes greater significance. As a consequence, viscosity of conductive fluid 214 must be carefully adjusted for this application. Baffles, porous foam or other known damping devices may be employed to obtain proper fluid 214 characteristics. Alternatively, fluid 214 may be replaced with conductive balls or other flowing conductive material capable of acceleration-induced displacement in the manner of conductive fluid 214.

Pitch sensor 200 may be plated with gold or another appropriate material to prevent corrosion or reaction between conductive fluid 214 and the internal surfaces of pitch sensor 200. Such plating would greatly extend the life of sensor 200 and provide stability to conductive fluid 214 by preventing additional conductive ions from going into solution.

As demonstrated above, the geometry of and the geometric relationships between pitch sensor 200 components dictate the performance characteristics of pitch sensor 200 of the present invention. A practitioner in the art would therefore be able to design and implement an appropriate pitch sensor 200 for the particular application in which it is to be used.

Although the discussion above is directed to electrically conductive fluid 214, a dielectric fluid or other flowing dielectric medium may also be employed in pitch sensors 200 of the present invention. In the dielectric fluid embodiment of pitch sensor 200, a voltage output is derived from a comparison of the capacitance between outer tubes 206 and 208 and rod 212. A dielectric fluid useful in the present invention is, for example, glycerin, petroleum oils and synthetic fluids. Input impedance should be high, greater than about 10 mega-ohms, for pitch sensors 200 employing dielectric fluids. Since the geometric configuration of pitch sensor 200 components impacts dielectric fluid sensors 200 in substantially the same manner as conductive fluid 214 sensors 200, and the nature and properties of dielectric fluids are known, a practitioner in the art would also be able to design and implement appropriate dielectric pitch sensors 200.

In another device which operates on the same principle, the inner conductive member is not located within the first and second outer conductive members, but is instead located between them. For example, the inner member can be a cylinder of approximately the same dimensions as the outer members and be joined to the outer members by appropriate coupling means. In use, fluid flows from one of the outer members to the other via the inner member, thereby altering the conductance or resistance between the inner member and each of the outer members. These electrical properties can be measured in much the same manner as described earlier.

The operational characteristics of this device can be adjusted by varying the dimensions of the three members, in particular the length/diameter ratios and the separation between the conductive members. Also, the sensitivity of the device can be adjusted by varying the amount of fluid which is placed within the device.

Figure 9:
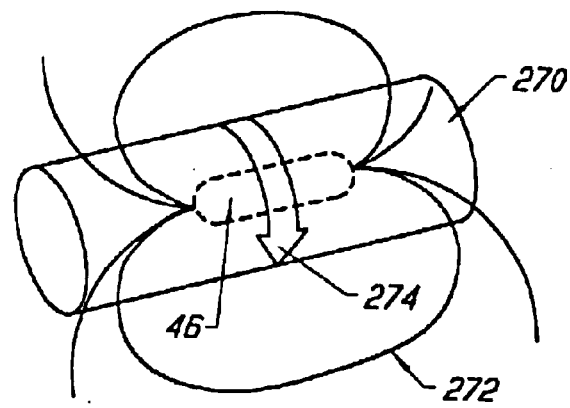
FIG. 9 shows a perspective view of a conductive transmitter housing with a magnetic field transmitting antennae disposed therein.

FIG. 9 shows a configuration of magnetic transmitting antenna 46 contained in a conductive housing 270. A magnetic field 272 derived from antenna 46 induces a voltage in housing 270 that causes electrical current 274 to flow. Current 274 is depicted, for simplicity, as a single line in FIG. 9, but, in actuality, it is a distribution on the surface of housing 270 ascertainable from Maxwell's equations. Surface current 274 induces a counter magnetic field that tends to cancel field 272 derived from antenna 46. As the conductivity of housing 270 decreases, the intensity of current 274 decreases, thereby diminishing the countering field intensity. If a perfect insulating housing 270 were used, no current 274 would flow, and the entire magnetic field 272 induced by antenna 46 would radiate unattenuated. Unfortunately, a conductive metal such as steel produces an amount of current 274 sufficient to virtually eliminate radiated magnetic field 272.

Figure 10:
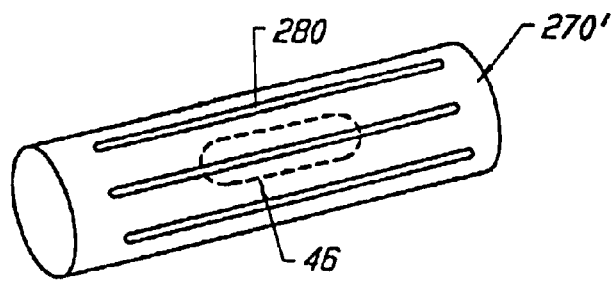
FIG. 10 shows a perspective view of a conductive transmitter housing of the present invention with a magnetic field transmitting antennae disposed therein.

FIG. 10 shows a means of reducing surface current 274 in conductive housing 270 to substantially increase radiated magnetic field 272. The principal difference between housing 270' (FIG. 10) and housing 270 (FIG. 9) is that one or more narrow elongated slots 280 are formed in housing 270'. Slots 280 increase current path length which, because housing 270' is not a perfect conductor, will increase apparent resistance. This increase in resistance, in turn, reduces surface current 274 and the resulting, opposing magnetic field. Alternatively, slots 280 may be replaced by a plurality of elongated apertures of any configuration sufficient to increase current path length.

Slot(s) 280 need only be wide enough to disrupt current 274 flow. Such narrow gap(s) do not readily allow debris penetration and are easily filled to prevent water intrusion. The filler material need only be strong enough to withstand the torque loads on housing 270', or, alternatively, elastic enough to deform in response to those loads and restore to its original shape once the loads have been removed. Since slot(s) 280 are narrow, the filler material is also substantially protected from abrasion caused by the rock and soil material being bored. Composite or ceramic materials could therefore be used as filler materials to restore most of the torsional rigidity and strength to housing 270'.

As stated previously, antennae 46 useful in transmitter 10 of the present invention are known and commercially available. Similarly, slotted housing 270' of the present invention may be fabricated from commercially available steel tubing using known techniques. As a result, a practitioner in the art would be capable of producing and implementing slotted housing 270' of the present invention.

Housing 270 and 270' tests were conducted using steel tubes with inside diameters of approximately 1 inch and a 1.25 inch outside diameter. An antenna consisting of a ferrite rod, approximately 0.29 inches in diameter by 1 inch long with windings having an outside diameter of about 0.45 inches, was centrally placed in each tube. Four tubes were tested having zero slots (housing 270), one slot (housing 270'), two slots (housing 270') and four slots (housing 270'). Slots were 0.125 inches wide by 4.5 to 5.5 inches long. Data were taken using a precision receiver of the present invention located 85 inches from the antenna Table 1 shows the results of this testing. All signal strengths are referenced to an antenna not contained in a housing, representing 100% of the signal generated by the antenna.

TABLE 1

Magnetic Field Strength Measurements

| Signal Configuration Ratio | Orientation | Signal Strength | Strength |
|---|---|---|---|
| No cover dB | — | 4.920 | 0.0 dB |
| No slots | — | 0.000 | −Inf. dB |
| 1 slot | 1 | 1.139 | −12.7 dB |
|  | 2 | 1.098 | −13.0 dB |
|  | 3 | 1.060 | −13.3 dB |
|  | 4 | 1.103 | −13.0 dB |
| 2 slots | 1 | 1.945 | −8.1 dB |
|  | 2 | 1.940 | −8.1 dB |
| 4 slots | 1 | 2.835 | −4.8 dB |
|  | 5 | 2.835 | −4.8 dB |

The results indicate that the antenna disposed within the housing without slots (housing 270) generated no measurable signal at the receiver. One slot (housing 270') allowed about 22% of the signal to penetrate the housing, with about 0.6 dB variation in signal strength dependent upon orientation. With 2 slots (housing 270'), virtually no variation in the signal strength with orientation was observable, and better than 39% of the signal penetrated the housing. With 4 slots (housing 270'), no variation in signal strength was observed, and more than 57% of the signal penetrated the housing.

Tests with other antennae were conducted to explore other structural/functional relationships involving housing 270' and components disposed therein. If the antenna diameter was increased until it became a large fraction of the inside diameter of housing 270' (approximately 80%), a noticeable loss of Q (i.e., the ratio of stored energy to dissipated energy) in the antenna and a substantial decrease in radiated magnetic field were observed. As a result, the housing diameter is preferably large in comparison to the antenna diameter.

An antenna having a core that was 0.2 inches in diameter by 0.72 inches long and an outer winding diameter of 0.40 inches showed almost identical results for signal strength ratios. This indicates that slot length-to-antenna length ratio is not critical beyond a minimum ratio. The ratio of housing 270' inside diameter-to-antenna diameter does not appear to be critical below a maximum ratio. Preferred embodiments of the present invention employ a housing 270' inside diameter-to-antenna diameter ratio of approximately 2.5 or more. Once these ratios are achieved, the number of slots and the length thereof assumes greater importance. An increase in slot number produces narrower conductor paths, increasing the effective resistance and therefore reducing signal losses. The length of the slots increase the conductive path length and therefore increase the resistance. The number of slots in the cover will be restricted by structural considerations and will vary from one tool design to another. The minimum slot length corresponds to approximately 1.5 antenna lengths.

Figure 11:
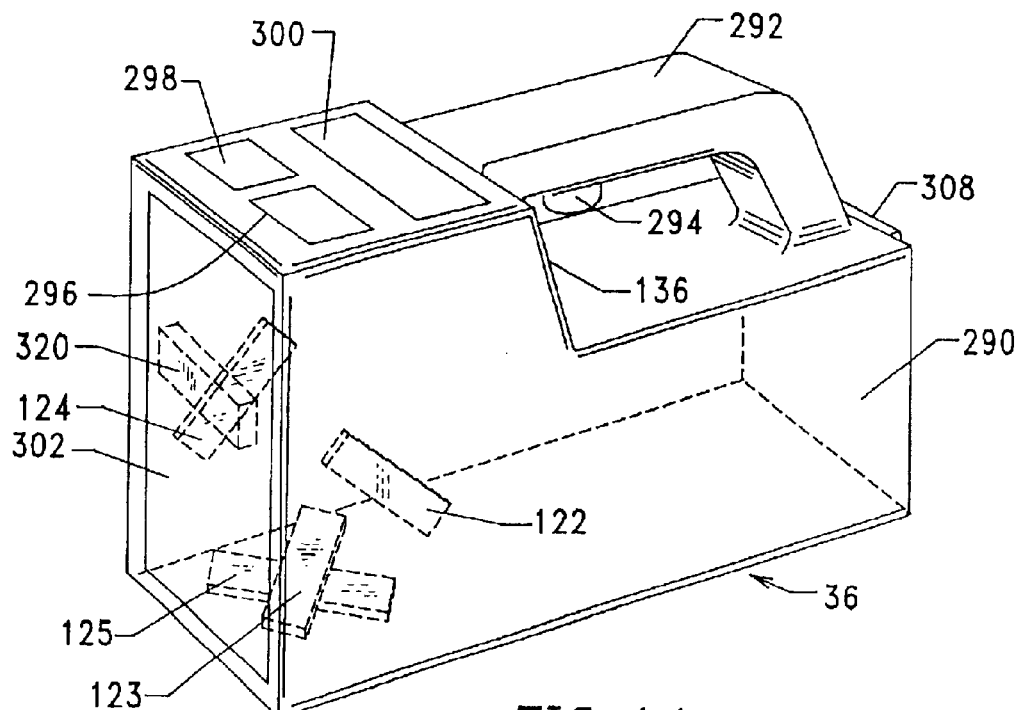
FIG. 11 shows a perspective view of an embodiment of a receiver of the locator/monitor of the present invention.

A preferred receiver 36 of the present invention is shown in FIG. 11. Receiver 36 is preferably a convenient size for portable use. Preferred receiver 36 may, for example, be approximately 1 foot square (X and Y dimensions) by approximately 5 inches wide (Z dimension). A case 290 is formed from a non-magnetic, non-conductive material such as fiberglass or a styrene plastic, such as ABS, so that the magnetic field generated by transmitter 10 is able to penetrate case 290 without attenuation. A handle 292 is provided to allow operator 26 to hold and manipulate receiver 36. A trigger switch 294 provides all control functions for the operation of receiver 36 including power switching, calibration, range compensation and locating functions. Specifically, trigger switch 294 has a variety of settings and/or may be depressed for certain time periods or at specific times during use to initiate specific receiver functions or as a prerequisite to such functions. Displays 296, 298 and 300 provide information to operator 26 regarding range to transmitter 10, transmitter 10 orientation and receiver 36 battery condition. Beeper 136 provides audible cues to facilitate calibration and locating functions as well as to identify errors in procedures or functions. Cover plate 302 provides access to receiver 36 electronics.

Figure 12:
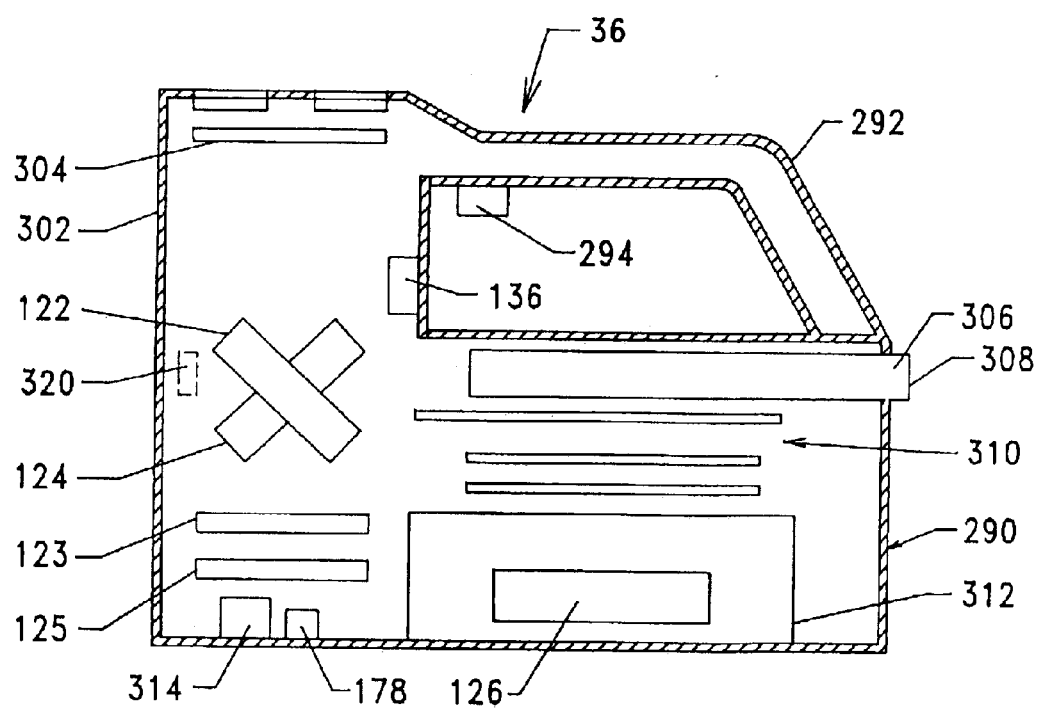
FIG. 12 shows a cross-sectional view of a receiver of an embodiment of the locator/monitor of the present invention shown in FIG. 11.

A cross-sectional view of receiver 36 is shown in FIG. 12. Displays 296, 298 and 300 and associated electronic drives are arranged on a printed circuit card 304. An orthogonal set of antennae 122 and 124 are attached to the side of case 290. Power is supplied by a set of batteries (not shown) loaded into an assembly 306 and held in place by battery cover 308. An additional set of printed circuit cards 310 are arranged above an electronics assembly support 312. Attached to electronics assembly support 312 is rollpitch receiving antenna 126. Two ultrasonic transducers 314 (i.e., ultrasonic transmitter 186 and ultrasonic receiver 188) are mounted to the bottom of case 290. Temperature sensor 178 is also mounted to the bottom of case 290.

Equipment cases having handles, triggers, displays, battery-containing assemblies and the like are known in the art. Such equipment may be fabricated from known materials and components to achieve a portable apparatus. In addition, the electronic/mechanical interface at trigger switch 294 and electronics relating to displays 296, 298 and 300 are within the purview of a practitioner in the art. As a result, one of ordinary skill in the art could design and implement preferred cases 290 of the present invention.

In operation, the transmitter is installed in the head of a boring tool used to drill a predominately horizontal hole. The transmitter provides an amplitude modulated signal that consists of the carrier frequency (e.g., 32768 Hz) and two tones that are changed four times over a one-second interval followed by a single tone lasting one second used as a delimiter. The tones preferably range in frequency from about 400 to about 900 Hz, for example, so that the entire signal is contained in a bandwidth of less than 2 kHz, for example. Roll-pitch electronics in the receiver of the present invention has a bandwidth of less than 2 kHz, for example, to receive the transmitter signal. The depth receivers have a bandwidth of about 20 Hz, for example, so that roll/pitch modulation does not influence the depth output signal. The depth output signal is a function only of the strength of the received carrier frequency.

The inductor-antenna in the transmitter emits a signal that approximates a dipole field at distances greater than a few antenna coil lengths. The signal strength of a dipole field is known to vary as the inverse cube of the distance. This relationship is used to measure depth and calibrate the system. Since the transmitter has a well regulated power supply and stable components, the transmitted signal remains constant with time so that frequent recalibration is not required.

When necessary or desired, calibration is achieved by first holding the receiver unit near the surface above the transmitter and depressing the switch for approximately 2 seconds, for example. The CPU in the receiver measures the magnetic signal strength of the carrier and uses the ultrasonic system to measure the distance to the surface. The receiver is then raised and the switch again briefly depressed. A second set of magnetic and acoustic measurements are taken. The relationship between the signal strength and the range is then computed by the CPU and the proportionality constant stored. The distance between the receiver and transmitter will be shown on the receiver display in one inch increments. If the operator were to again briefly depress the switch, the receiver would measure the distance to the surface using the ultrasonic ranging system and subtract this value from the magnetic range to obtain the distance of the transmitter below the surface.

An expedited transmitter location process is also provided by the present invention. This process takes advantage of the fact that the orthogonal antenna system measures the total magnetic field strength in the plane of the antennae. When the receiver case (antenna plane) is pointed in a direction parallel to one of the dipole flux lines emanating from the transmitter, the measured field will be a maximum. The operator can therefore hold the receiver at a fixed location above the surface and rotate the case until a minimum distance to the transmitter is indicated. The operator can then move in the indicated direction for a distance related to the indicated distance and repeat the process. Repetition continues until the operator passes over the transmitter, as indicated by an increase in range. The location process must be accomplished in stages, because flux lines are not, in general, straight lines to the transmitter.

The sensitivity of the expedited locating process can be increased by using the square of the signal strength rather than the range which has an inverse cube root relation to the signal strength. Since the square of the signal strength is available from the vector sum process used to obtain the total in-plane signal strength, its use does not add significantly to the computational process. By comparing the current signal strength with the previously measured one, a sensitive signal peak can be determined.

The process consists of arming a beeper activation circuit after several consecutive signal strength increases are measured, indicating a peak searching mode. When the signal ceases to increase or decreases, a brief activation of the beeper occurs. With a measurement cycle time of 0.1 of a second, for example, the indication is quite accurate for moderate rates of signal strength change. In order to enhance the accuracy at faster rates of change, a predictor method may be used to estimate the rate of change of signal strength. If the predictor method determines the peak will occur before the next measurement, the routine measurement cycle is halted, and the beeper is activated after a delay estimated to be that required to reach peak signal.

The predictor may, for example, fit a quadratic function to three prior magnetic field strength readings to determine whether the field strength will pass through a maximum (i.e., zero slope point) prior to the next reading. If the predictor determines that a maximum will occur prior to the next reading, it suspends the next measurement cycle; waits until the estimated time to the maximum passes; and initiates the beeper. The predictor of the present invention is also preferably capable of ascertaining circumstances when extrapolation will not be accurate. Under these conditions, the predictor will not suspend the measurement cycle. If the predictor does not suspend the measurement cycle, and the subsequent measurement is less than the prior measurement, the predictor will initiate the beeper.

A case rotation process is used to determine the direction that the transmitter is pointed once the location of the transmitter has been found. The case rotation process may operate in the same manner as the locator process described above. Specifically, a predictor-controlled extrapolation process may be employed.

The peak signal squared value derived from the searching process may be held in memory. This peak held signal corresponds to the last measured magnetic field strength reading, rather than the extrapolated value. The receiver of the present invention will hold the signal for a specified time period, for example, 2 seconds, to allow the operator the option to further refine the searching process by comparing the current signal strength to the peak value. This is accomplished by the operator, for example, by depressing the switch within the time period for holding the peak signal after the peak signal beep sounds. As long as the switch remains depressed, the receiver will compare the current signal with the peak value and activate the beeper if the current signal strength equals or surpasses the peak held value.

This feature is useful for accurately locating the transmitter. If the operator holds the receiver closer to the surface than it was when the peak beep was heard, there will be an area above the surface where the beeper will sound. As the receiver is raised the area will become smaller. Eventually, a beep will sound at only one location. This process provides a very accurate location. A similar process can be used to establish the pointing direction (i.e., yaw) of the transmitter, replacing lateral and longitudinal displacements with rotation. Specifically, an initial wide angle in which the beeper function is activated will narrow as the receiver is elevated, until the yaw orientation is pinpointed.

The signal strength comparison may also be presented visually using a +/− sign on a display, for example. If the signal strength is increasing, indicating a reduction in range, the − sign is displayed. If the signal strength is decreasing, indicating an increase in range, the + sign is displayed.

The digital signals received by the roll-pitch receiver and sent to the CPU are decoded and displayed. The roll orientation may, for example, be represented as clock positions in 30 degree increments, 1 through 12. The pitch may, for example, be displayed in degrees from +90 to −90. An indication may additionally be provided when the roll and pitch displays are updated by flashing a sign on the pitch display.

A sign may also be used to indicate that the receiver should be recalibrated. This determination is established whenever the temperature of the receiver has changed at least 10.degree. C. since the last calibration. Any other appropriate criteria may also be used in making the recalibration determination.

A timer in the CPU determines whether the switch has been activated in the past 5 minutes, for example. If the switch has not been activated within the appropriate time frame, the receiver is switched off. Depressing the switch returns power to the receiver.

The bandwidth values, time constraints, trigger switch activation particulars and the like presented above are exemplary. Other appropriate and substantially equivalent indicators or procedures may be used to accomplish these tasks. A practitioner in the art could produce and implement a receiver case housing with appropriate operational mechanics, electronics and electromechanics.

A procedure for locating the transmitter is based on having the two receiving antennae oriented at a 45 degree angle to level. With this orientation the signal strength in the two antennae will balance at three locations along a line in a vertical plane containing the axis of the transmitting antenna. One location will be approximately above the transmitting antenna, one will be behind the transmitting antenna and one will be ahead of the transmitting antenna. Referring to FIG. 12, if the receiving antennae are moved forward (to the left) along the line starting from a substantial distance from the transmitting antenna, the signal strength would be greater in antenna 124 than in antenna 122 assuming that the transmitting antenna was to the left of the receiving antennae. As the receiving antennae are moved forward (to the left) the signal strength will reach a balance point where the flux line from the transmitting antenna through the receiving antennae is vertical. As the receiving antennae are moved farther toward the transmitting antenna, the signal strength will be greater in antenna 122 until the point where the strengths in both antennae are balanced. At this point, the flux line is horizontal and the receiving antennae are substantially over the transmitter. The exact location of the balance will vary slightly due to the pitch angle of the transmitting antenna. Beyond this mid-balance point, the signal in antenna 124 will be greater until a third balance point is reached when the flux line through the receiving antennae is again vertical. Beyond this fore-balance point, the signal strength will again be greater in antenna 122.

By noting the transition of greater signal strength between antennae 122 and 124 at the balance point, it is possible to distinguish the point substantially over the transmitting antenna from the other two points of balance. That is, there is only one transition of greater signal strength from antenna 122 to antenna 124 while there are two transitions from 124 to 122.

The two locations where greater signal strength transitions from antenna 124 to antenna 122 can be used to provide two lateral locates which are in planes perpendicular to the axis of the transmitting antenna, one ahead and one behind. This locating procedure indicates the lateral position and direction of the transmitter. At these two balance points, the magnetic flux lines from the transmitting antenna extend in a radial direction along a circle passing through the receiving antennae contained in the planes which are substantially perpendicular to the axis of the transmitter. If the receiving antennae are rotated about a vertical axis such that the receiving antennae axes are in the same plane as the radial flux line, then another signal strength balance point can be found. This point will be on the line formed by the intersection of the vertical plane through the transmitting antenna and the plane of the radial flux lines. A mark or flag can be placed on the surface of the ground directly below the point. A corresponding point can also be found on the other end of the transmitting antenna and the surface of the ground marked accordingly. The line connecting the two points will be in the vertical plane containing the axis of the transmitter and therefore provide the lateral locate. Then the balance point at the transition of greater signal strength from antenna 122 to antenna 124 as the receiver is moved forward along the line will provide a location substantially over the center of the transmitting antenna.

An important feature of the procedure just outlined for the lateral locate is the use of the vertical component of the flux field to obtain a balance when the plane of the receiving antennae is perpendicular to the axis of the transmitting antenna. This means that any point behind or ahead of the balance point substantially above the transmitting antenna could be used since the flux lines at any other location except substantially over the transmitting antenna would have a vertical component Although the best sensitivity will be obtained by using the fore and aft balance points, the procedure will work without having to find these points.

In practice, acceptable lateral locates have been obtained by first finding the mid-balance point above the transmitting antenna, then marking the location by having the locating operator place their foot on the ground below the receiving unit and then pivoting on that foot so as to be able to move the receiver perpendicular to the axis of the transmitter within normal reach-ahead or behind the marked location.

A similar locating process can be accomplished employing only one horizontal receiving antenna With the single antenna configuration, the locations where the flux lines are substantially vertical would cause a null signal in the receiving antenna, and the location substantially over the transmitting antenna would cause a maximum or peak in the induced signal strength in the receiving antenna. One difference between the single-antenna and the dual-antennae locating methods is that with the single-antenna method there is no indication as to the direction to move to find the null or maximum such as the relative signal strength described above.

In practice, a "+" and "−" symbol have been used on the receiver's display to denote which receiving antenna has the greater induced signal strength. If antenna 124 has the greater signal strength, a "+" is displayed, and if antenna 122 has the greater signal strength, a "−" is displayed. Moving the receiver forward toward the transmitting antenna from a great distance, the display will first show a "+" then switch to a "−" at the aft balance point where the flux line is substantially vertical. Moving on in the same direction, the display will then transition to a "+" at the balance point substantially over the transmitting antenna where the flux line is level. Moving on farther, the display will finally transition to a "−" at the fore balance point where the flux line is again substantially vertical. By finding "−" to "+" transition, the balance point substantially over the transmitting antenna can be distinguished from the other two balance points which will be "+" to "−" transitions.

The complete locating procedure using the fore and aft signal balance points have been found to provide very good accuracy not only for the location of the transmitting antenna but also for the direction that the antenna is pointing.

A receiver as is described in this application can also be used to identify and measure the angular and horizontal displacement of a transmitter. When used for this purpose, the orthogonally oriented antennae are in a horizontal plane. The two antennae detect the signal from the transmitter which is horizontally displaced from the receiver and at a distance from the receiver. For example, the receiver may be located at a position to which a boring tool is directed. The boring tool can he started towards the location of the receiver from a location at a distance from the receiver. As the boring device progresses towards the receiver, the receiver can detect when the flux line from the transmitting antenna through the receiving antennae are deflected so as not to cause equal signals to be induced. Such a deflection can be caused by an angular deflection, a lateral deflection or a combination of both.

When the boring device is angularly and/or laterally displaced from a direct flux line path towards the receiver, one of the two orthogonally oriented antennae will detect a stronger signal than the other antenna and this will be indicative of the direction in which the boring device must be steered. An appropriate visual indication can be given to the operator as to which of the two antennae is receiving the greater signal and thus the direction to which the boring device must be steered. This enables the operator to correct the direction of the boring device's progress.

Optionally, the CPU can calculate the displacement of the boring tool from a flux line heading to the receiver as a function of the ratio between the signal strengths measured by the two antennae. This information can be useful in helping the operator to determine the degree of correction which is required. It is also possible to reduce or eliminate the need for an operator by providing an appropriate connection between the receiving unit and the boring control device. When the receiver senses that the boring tool is displaced from a flux line course to the receiver, it can transmit to the boring control device an indication of the direction and, optionally, the magnitude of the error. In response to this input, the boring control device can automatically adjust the direction in which the boring tool moves in order to bring the tool back into a flux line path towards the receiver.

In yet another version of such a control device, the receiver includes two pairs of receiving antennae, the antennae in each pair being orthogonally oriented to each other, with one pair in a horizontal plane and the other pair in a vertical plane. The antenna pair in the horizontal plane functions to provide an indication of the displacement of the boring tool as described above, and the vertically oriented pair provides an indication of the vertical displacement of the boring tool in a similar manner. Such a device can provide simple, reliable and automatic control progress of a boring tool.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed:

1. In producing an underground boring tool having a drill head configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

positioning a transmitter in said interior chamber for originating said locating signal such that transmission of the locating signal by the transmitter induces a current flow in said wall arrangement, resulting in a counter magnetic field originating from the wall arrangement, upon transmission of the locating signal; and forming a number of elongated slots in said wall arrangement including at least two elongated slots which are arranged at least generally in said elongation direction and spaced apart about said wall arrangement, each slot having a width that is just wide enough to disrupt said current flow, thereby reducing the counter magnetic field and said number of said slots is formed based, at least in part, on said locating signal exhibiting a signal strength that is substantially independent of roll orientation of the boring tool.

2. The method of claim 1 wherein each of said slots includes an overall elongated length and wherein said current path is broken entirely along said overall elongated length of each slot.

3. The method of claim 1 wherein each of said slots includes an overall elongated length and wherein said width is substantially constant along said elongated length of each slot.

4. The method of claim 1 further comprising the steps of protecting said transmitter by filling said slots with a filler material.

5. The method of claim 4 including the step of choosing the filler material to contribute to torsional rigidity and strength of said elongated electrically conductive wall arrangement.

6. The method of claim 5 wherein said slots are filled with a ceramic material.

7. The method of claim 5 wherein said slots are filled with a composite material.

8. The method of claim 4 wherein said slots are filled with an elastic material.

9. The method of claim 4 wherein said slots are filled with a rigid material.

10. In producing an underground boring tool having a drill head configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

positioning a transmitter in said interior chamber for originating said locating signal such that transmission of the locating signal by the transmitter induces a current flow in said wall arrangement, resulting in a counter magnetic field originating from the wall arrangement, upon transmission of the locating signal; and forming at least two elongated slots in said wall arrangement which are arranged at least generally in said elongation direction and spaced apart about said wall arrangement, each slot having a width that is just wide enough to disrupt said current flow, thereby reducing the counter magnetic field and at least one of said slots is formed having a width of approximately 0.125 inches.

11. In producing an underground boring tool having a drill head configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

positioning a transmitter in said interior chamber for originating said locating signal such that transmission of the locating signal by the transmitter induces a current flow in said wall arrangement, resulting in a counter magnetic field originating from the wall arrangement, upon transmission of the locating signal; and forming at least four of said slots spaced apart about said elongated electrically conductive wall arrangement which slots are arranged at least generally in said elongation direction, each slot having a width that is just wide enough to disrupt said current flow, thereby reducing the counter magnetic field.

12. In producing an underground boring tool having a drill head configured for allowing the transmission of a ground penetrating locating signal, a method comprising the steps of:

providing an elongated electrically conductive wall arrangements, as part of said drill head for direct contact with the ground, including a pair of opposing ends to at least partially bound an interior chamber formed between said opposing ends, said wall arrangement further extending in an elongation direction between the opposing ends;

positioning a transmitter in said interior chamber for originating said locating signal such that transmission of the locating signal by the transmitter induces a current flow in said wall arrangement, resulting in a counter magnetic field originating from the wall arrangement, upon transmission of the locating signal; and forming at least four of said slots in said elongated electrically conductive wall arrangement such that approximately no variation in signal strength is exhibited by the locating signal surrounding the boring tool and said slots are arranged at least generally in said elongation direction and spaced apart about said wall arrangement, each slot having a width that is just wide enough to disrupt said current flow, thereby reducing the counter magnetic field.

13. In producing an underground boring tool having a drill head configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

positioning a transmitter in said interior chamber for originating said locating signal such that transmission of the locating signal by the transmitter induces a current flow in said wall arrangement, resulting in a counter magnetic field originating from the wall arrangement, upon transmission of the locating signal; and forming at least two elongated slots in said wall arrangement which are arranged at least generally in said elongation direction and spaced apart about said wall arrangement, each slot having a width that is just wide enough to disrupt said current flow, thereby reducing the counter magnetic field and each slot includes a length and at least one slot is formed having a ratio of length to width of approximately 1/36.

14. In producing an underground boring tool having a drill head configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

positioning a transmitter in said interior chamber for originating said locating signal such that transmission of the locating signal by the transmitter induces a current flow in said wall arrangement, resulting in a counter magnetic field originating from the wall arrangement, upon transmission of the locating signal; and forming at least two elongated slots in said wall arrangement which are arranged at least generally in said elongation direction and spaced apart about said wall arrangement, each slot having a width that is just wide enough to disrupt said current flow, thereby reducing the counter magnetic field and each slot includes a length and at least one slot is formed having a ratio of length to width of approximately 1/44.

15. In the fabrication of a drill head for supporting a transmitter as part of an underground boring tool configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

forming a first elongated slot in said wall arrangement which is arranged at least generally in said elongation direction, said first elongated slot having a width that is just wide enough to disrupt a current flow in said housing induced by said transmitter when transmitting from within the housing so as to reduce a counter magnetic field that is induced in said wall arrangement by said current;

forming a second elongated slot in said wall arrangement which is arranged at least generally in said elongation direction and spaced apart from said first elongated slot about said wall arrangement, said first elongated slot having said width that is just wide enough to disrupt said current flow in said housing induced by said transmitter so as to further reduce said counter magnetic field;

forming an additional slot in said elongated electrically conductive wall arrangement having said width to additionally disrupt the current flow to additionally reduce variation in the signal strength of the locating signal surrounding the boring tool; and forming further additional slots until approximately no variation is exhibited in the locating signal surrounding the boring tool.

16. The method of claim 15 wherein each of said slots includes an overall elongated length and wherein said current path is broken entirely along said overall elongated length of each slot.

17. The method of claim 15 wherein each of said slots includes an overall elongated length and wherein said width is substantially constant along said elongated length of each slot.

18. In the fabrication of a drill head for supporting a transmitter as part of an underground boring tool configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

forming a first elongated slot in said wall arrangement which is arranged at least generally in said elongation direction, said first elongated slot having a width that is just wide enough to disrupt a current flow in said housings induced by said transmitter when transmitting from within the housing so as to reduce a counter magnetic field that is induced in said wall arrangement by said current;

forming a second elongated slot in said wall arrangement which is arranged at least generally in said elongation direction and spaced apart from said first elongated slot about said wall arrangement, said first elongated slot having said width that is just wide enough to disrupt said current flow in said housing induced by said transmitter so as to further reduce said counter magnetic field;

forming an additional slot in said elongated electrically conductive wall arrangement having said width to additionally disrupt the current flow to additionally reduce variation in the signal strength of the locating signal surrounding the boring tool; and forming further additional slots based, at least in part, on configuring said locating signal to exhibit a signal strength that is substantially independent of roll orientation of the boring tool.

19. In the fabrication of a drill head for supporting a transmitter as part of an underground boring tool configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

forming a first elongated slot in said wall arrangement which is arranged at least generally in said elongation direction, said first elongated slot having a width that is just wide enough to disrupt a current flow in said housing induced by said transmitter when transmitting from within the housing so as to reduce a counter magnetic field that is induced in said wall arrangement by said current;

forming a second elongated slot in said wall arrangement which is arranged at least generally in said elongation direction and spaced apart from said first elongated slot about said wall arrangement, said first elongated slot having said width that is just wide enough to disrupt said current flow in said housing induced by said transmitter so as to further reduce said counter magnetic field;

forming an additional slot in said elongated electrically conductive wall arrangement having said width to additionally disrupt the current flow to additionally reduce variation in the signal strength of the locating signal surrounding the boring tool; and forming further additional slots until the locating signal surrounding the boring tool is approximately axisymmetric.

20. In the fabrication of a drill head for supporting a transmitter as part of an underground boring tool configured for allowing the transmission of a ground penetrating locating signal, a method comprising the steps of:

providing an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends;

forming a first elongated slot in said wall arrangement which is arranged at least generally in said elongation direction, said first elongated slot having a width that is just wide enough to disrupt a current flow in said housing induced by said transmitter when transmitting from within the housing so as to reduce a counter magnetic field that is induced in said wall arrangement by said current; and forming a second elongated slot in said wall arrangement which is arranged at least generally in said elongation direction and spaced apart from said first elongated slot about said wall arrangement, said first elongated slot having said width that is just wide enough to disrupt said current flow in said housing induced by said transmitter so as to further reduce said counter magnetic field and forming two additional slots such that four of said slots are formed spaced apart about said elongated electrically conductive wall arrangement.

21. In the fabrication of a drill head housing, as part of an underground boring tool configured for allowing transmission of a ground penetrating locating signal from a transmitter, a method comprising the steps of:

providing an elongated drill head housing member for direct contact with the ground, serving as at least one part of said drill head housing, and defining an interior between opposing ends of the housing member for receiving said transmitter to isolate the transmitter from ground contact during drilling;

forming a first elongated slot in the wall of said elongated drill head housing, said slot having a width that is just wide enough to disrupt a current flow in said elongated housing induced by said transmitter when transmitting from within the housing which thereby reduces a counter magnetic field in the housing;

forming a second elongated slot having said width to further disrupt the current flow induced in said housing such that a radiated signal strength from said transmitter around said drill head is substantially independent of boring tool roll orientation;

forming an additional slot in said drill head housing member having said width to disrupt the current flow in the housing member to further reduce variation in the signal strength of the locating signal surrounding the boring tool; and forming further additional slots until approximately no variation is exhibited in the locating signal surrounding the boring tool.

22. The method of claim 21 wherein each of said slots includes an overall elongated length and wherein said current path is broken entirely along said overall elongated length of each slot.

23. The method of claim 21 wherein each of said slots includes an overall elongated length and wherein said width is substantially constant along said elongated length of each slot.

24. In the fabrication of a drill head housing, as part of an underground boring tool configured for allowing transmission of a ground penetrating locating signal from a transmitter, a method comprising the steps of:

providing an elongated drill head housing member for direct contact with the ground, serving as at least one part of said drill head housing, and defining an interior between opposing ends of the housing member for receiving said transmitter to isolate the transmitter from ground contact during drilling;

forming a first elongated slot in the wall of said elongated drill head housing, said slot having a width that is just wide enough to disrupt a current flow in said elongated housing induced by said transmitter when transmitting from within the housing which thereby reduces a counter magnetic field in the housing;

forming a second elongated slot having said width to further disrupt the current flow induced in said housing;

forming an additional slot in said drill head housing member having said width to disrupt the current flow in the housing member to further reduce variation in the signal strength of the locating signal surrounding the boring tool; and forming further additional slots based, at least in part, on said locating signal exhibiting a signal strength that is substantially independent of roll orientation of the boring tool.

25. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangement, upon transmission of the locating signal, said electrically conductive wall arrangement defining a number of elongated slots including at least two elongated slots which are arranged at least generally in said elongation direction and spaced apart about said wall arrangement, each slot having a width that is just wide enough to disrupt said current flow, thereby reducing the counter magnetic field and said number of slots is formed based, at least in part, on said locating signal exhibiting a signal strength that is substantially independent of roll orientation of the boring tool.

26. The assembly of claim 25 wherein each of said slots includes an overall elongated length and wherein said current path is broken entirely along said overall elongated length of each slot.

27. The assembly of claim 25 wherein each of said slots includes an overall elongated length and wherein said width is substantially constant along said elongated length of each slot.

28. The assembly of claim 25 wherein said slot is filled with a filler material to protect said transmitter and the width of each elongated slot is sufficiently narrow to protect the filler material disposed in the slot from abrasion during boring.

29. The assembly of claim 28 wherein said filler material contributes to torsional rigidity and strength of said housing.

30. The assembly of claim 29 wherein said filler material is a ceramic material.

31. The assembly of claim 30 wherein said filler material is a composite material.

32. The assembly of claim 28 wherein said filler material is an elastic material.

33. The assembly of claim 28 wherein said filler material is a rigid material.

34. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangement, upon transmission of the locating signal, said electrically conductive wall arrangement defining at least two elongated slots which are arranged at least generally in said elongation direction and spaced apart about said wall arrangement, each slot having a width that is just wide enough to disrupt said current flow, thereby reducing the counter magnetic field and at least one slot includes a width of approximately 0.125 inches.

35. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangement, upon transmission of the locating signal, said electrically conductive wall arrangement defining four elongated slots which are arranged at least generally in said elongation direction and spaced apart about said wall arrangement, each slot having a width that is just wide enough to disrupt said current flow, thereby reducing the counter magnetic field.

36. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangement, upon transmission of the locating signal, said electrically conductive wall arrangement defining a number of elongated slots which are arranged at least generally in said elongation direction and spaced apart about said wall arrangement, each slot having a width that is just wide enough to disrupt said current flow, thereby reducing the counter magnetic field and said number of elongated slots includes at least four of said slots formed in said elongated electrically conductive wall arrangement such that approximately no variation in signal strength is exhibited by the locating signal surrounding the boring tool.

37. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangement, upon transmission of the locating signal, said electrically conductive wall arrangement defining at least two elongated slots which are arranged at least generally in said elongation direction and spaced apart about said wall arrangement, each slot having a width that is just wide enough to disrupt said current flow, thereby reducing the counter magnetic field and each slot includes a length and a ratio of length to width of approximately 1/36.

38. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangment, upon transmission of the locating signal, said electrically conductive wall arrangement defining at least two elongated slots which are arranged at least generally in said elongation direction and spaced apart about said wall arrangement, each slot having a width that is just wide enough to disrupt said current flow, thereby reducing the counter magnetic field and said slot includes a length and a ratio of length to width of approximately 1/44.

39. In an underground boring tool having a drill head configured for allowing the transmission of a ground penetrating locating signal, an assembly comprising:

a transmitter for originating said locating signal; and an elongated electrically conductive wall arrangement, as part of said drill head for direct contact with the ground, including a pair of opposing ends to at least partially bound an interior chamber formed between said opposing ends, said wall arrangement further extending in an elongation direction between the opposing ends and said transmitter being positioned in said interior chamber such that transmission of the locating signal by the transmitter induces a current flow in said wall arrangement, resulting in a counter magnetic field originating from the wall arrangement, upon transmission of the locating signals, said electrically conductive wall arrangement defining at least two elongated slots which are arranged at least generally in said elongation direction and spaced apart about said wall arrangement, each slot having a width that is just wide enough to disrupt said current flow, thereby reducing the counter magnetic field and said elongated electrically conductive wall arrangement further defines an additional slot having said width to additionally disrupt the current flow in said housing to additionally reduce variation in the signal strength of the locating signal surrounding the boring tool.

40. The assembly of claim 39 wherein the elongated electrically conductive wall arrangement defines further additional slots until approximately no variation is exhibited in the locating signal surrounding the boring tool.

41. The assembly of claim 39 wherein a number of said additional slots are defined based, at least in part, on said locating signal exhibiting a signal strength that is substantially independent of roll orientation of the boring tool.

42. The assembly of claim 39 wherein the elongated electrically conductive wall arrangement defines further additional slots until the locating signal surrounding the boring tool is approximately axisymmetric.

43. The assembly of claim 39 wherein said elongated electrically conductive wall arrangement defines four of said slots.

44. In an underground boring tool configured for transmitting a ground penetrating locating signal, a method comprising the steps of:

providing an electrically conductive housing having an exterior surface for direct contact with the ground as part of an exterior outline of the boring tool, said housing defining an interior having an interior housing diameter;

positioning a transmitter, including an antenna coil having an antenna outer diameter and an antenna length, in said housing interior for emanating said locating signal such that a ratio of the interior housing diameter to the antenna outer diameter is approximately 2.5 or more; and forming a number of elongated narrow slots in the housing proximate to said antenna coil based, at least in part, on structural integrity of said housing and having a minimum slot length of approximately 1.5 times the antenna length.

45. The method of claim 44 wherein transmission of the locating signal by the antenna coil within the housing induces a current flow in the housing and a resulting a counter magnetic field originating from the housing and wherein each slot is formed having a width that is just wide enough to disrupt said current flow in said housing.

46. The method of claim 45 wherein each of said slots includes an overall elongated length and wherein said current path is broken entirely along said overall elongated length of each slot.

47. The method of claim 45 wherein each of said slots includes an overall elongated length and wherein said width is substantially constant along said elongated length of each slot.

48. The method of claim 45 further comprising the steps of protecting said transmitter by filling each slot with a filler material.

49. The method of claim 48 including the step of choosing the filler material to contribute to torsional rigidity and strength of said housing.

50. The method of claim 49 wherein said slot is filled with a ceramic material.

51. The method of claim 49 wherein said slot is filled with a composite material.

52. The method of claim 48 wherein said slot is filled with an elastic material.

53. The method of claim 48 wherein said slot is filled with a rigid material.

54. The method of claim 48 wherein said slot is formed having a width of approximately 0.125 inches.

55. The method of claim 44 wherein at least two of said slots are formed circumferentially spaced apart about said housing.

56. The method of claim 44 wherein four of said slots are formed in the housing axisymmetrically spaced around said housing.

57. The method of claim 44 wherein the number of slots is selected based, at least in part, on said locating signal exhibiting approximately no variation in signal strength surrounding the boring tool.

58. The method of claim 44 wherein a number of said slots are formed based, at least in part, on said locating signal exhibiting a signal strength that is substantially independent of roll orientation of the boring tool.

59. In an underground boring tool configured for transmitting a ground penetrating locating signal, a drill head for transmitting said locating signal and for forming a borehole, said drill head comprising:

a transmitter including an antenna coil having an antenna outer diameter and an antenna length for emanating said locating signal;

an electrically conductive housing having an exterior surface for direct contact with the ground as part of an exterior outline of the boring tool, said housing defining an interior having an interior housing diameter for receiving said transmitter, said housing further defining a number of elongated narrow slots proximate to said antenna coil, when received in the housing, with the number of slots based, at least in part, on structural integrity of said housing and having a minimum slot length of approximately 1.5 times the antenna length and such that a ratio of the interior housing diameter to the antenna outer diameter is approximately 2.5 or more.

60. The drill head of claim 59 wherein transmission of the locating signal by the antenna coil within the housing induces a current flow in the housing and a resulting a counter magnetic field originating from the housing and wherein each slot includes a width that is just wide enough to disrupt said current flow in said housing.

61. The drill head of claim 60 wherein each of said slots includes an overall elongated length and wherein said current path is broken entirely along said overall elongated length of each slot.

62. The drill head of claim 60 wherein each of said slots includes an overall elongated length and wherein said current path is broken entirely along said overall elongated length of each slot.

63. The drill head of claim 59 wherein each slot is filled with a filler material.

64. The drill head of claim 59 wherein the filler material contributes to torsional rigidity and strength of said housing.

65. The drill head of claim 63 wherein each slot is filled with a ceramic material.

66. The drill head of claim 63 wherein each slot is filled with a composite material.

67. The drill head of claim 63 wherein each slot is filled with an elastic material.

68. The drill head of claim 63 wherein each slot is filled with a rigid material.

69. The drill head of claim 59 wherein said each slot is formed having a width of approximately 0.125 inches.

70. The drill head of claim 59 wherein at least two of said slots are formed circumferentially spaced apart about said housing.

71. The method of claim 59 wherein four of said slots are formed in the housing axisymmetrically spaced around said housing.

72. The drill head of claim 59 wherein four of said slots are formed in the housing.

73. The drill head of claim 59 wherein the number of slots is selected based, at least in part, on said locating signal exhibiting approximately no variation in signal strength surrounding the boring tool.

74. The drill head of claim 59 wherein the number of slots is selected based, at least in part, on said locating signal exhibiting a signal strength that is substantially independent of roll orientation of the boring tool.

* * * * *

UNITED STATES PATENT AND TRADEMARK OFFICE
CERTIFICATE OF CORRECTION

PATENT NO. : 6,756,784 B2
APPLICATION NO. : 10/324804
DATED : June 29, 2004
INVENTOR(S) : John E. Mercer It is certified that error appears in the above-identified patent and that said Letters Patent is hereby corrected as shown below:

In the Title:

Column 1
Lines 1-4 at (54), change "Orientation Sensor Arrangement And Method For Use In A System For Monitoring The Orientation Of An Underground Boring Tool" to --Boring Tool Transmitter Housing Configured For Induced Current Disruption--

In the Specification:

Column 1,
Line 9, change "Pat. No. 6,525,535" to --Pat. No. 6,525,538--
Line 10, change "Ser. No. 09/518,905 file on" to --Ser. No. 09/518,905 filed on--
Line 13, change "No. 09/058,981 file on" to --No. 09/058,981 filed on--

Column 3,
Line 11, change "drifting of an a will" to --drifting of an antenna will--
Line 22, change "antennae" to --antenna--
Line 23, change "antennae" to --antenna--
Line 25, change "measurement One" to --measurement. One--

Column 6,
Line 17, change "180.degree. therefrom." to --180° therefrom.--

Column 7,
Line 46, change "invention-also" to --invention also--

Column 8,
Line 39, change "strength .alpha. 1/depth" to --strength $\alpha$ 1/depth--

Column 9,
Line 27, change "B$\alpha$.1/d$^3$" to --B$\alpha$1/d$^3$--

Column 10,
Line 28, change "antennae" to --antenna--

Column 11,
Line 35, change "45 .degree. angle" to --45° angle--
Line 53, change "OS, will" to --$OS_1$ will--

UNITED STATES PATENT AND TRADEMARK OFFICE
CERTIFICATE OF CORRECTION

PATENT NO. : 6,756,784 B2
APPLICATION NO. : 10/324804
DATED : June 29, 2004
INVENTOR(S) : John E. Mercer It is certified that error appears in the above-identified patent and that said Letters Patent is hereby corrected as shown below:

Column 13,
Line 46, change "45. degree, from" to --45° from--
Line 49, change "values range" to --values of range--

Column 14,
Line 43, change "antennae" to --antenna--

Column 15,
Lines 40-41, change "Tube and 208 are" to --Tubes 206 and 208 are--

Column 16,
Line 12, change "AID" to --A/D--

Column 19,
Lines 1-17, Table 1, insert at Line 17,
  --Orientation Notation:
  1 - Slot toward receiver
  2 - Slot perpendicular to receiver (90°)
  3 - Slot away from receiver
  4 - Slot perpendicular to receiver (-90°)
  5 - Slot 45° to receiver--

Column 22,
Line 42, change "10.degree. C. since" to --10° C since--

Column 24,
Line 4, change "receiving antenna With" to --receiving antenna. With--

In the Claims:

Column 27, Claim 12,
Line 2, change "arrangements" to --arrangement--

Column 29, Claim 18,
Line 1, change "housings" to --housing--

Column 31, Claim 31,
Line 59, change "31. The assembly of claim 30 wherein" to --31. The assembly of claim 29 wherein--

UNITED STATES PATENT AND TRADEMARK OFFICE
CERTIFICATE OF CORRECTION

PATENT NO. : 6,756,784 B2
APPLICATION NO. : 10/324804
DATED : June 29, 2004
INVENTOR(S) : John E. Mercer It is certified that error appears in the above-identified patent and that said Letters Patent is hereby corrected as shown below:

Column 33, Claim 39,
Line 66, change "signals" to --signal--

Column 34, Claim 45,
Lines 46-47, change "and a resulting a counter magnetic" to --and a resulting counter magnetic--

Columns 35-36, Claim 60,
Line 44 - Column 36, Line 1, change "and a resulting a counter magnetic" to --and a resulting counter magnetic--

Signed and Sealed this

Ninth Day of October, 2007

JON W. DUDAS
*Director of the United States Patent and Trademark Office*